US006370489B1

(12) United States Patent
Williams et al.

(10) Patent No.: US 6,370,489 B1
(45) Date of Patent: Apr. 9, 2002

(54) LAMP MONITORING AND CONTROL SYSTEM AND METHOD

(75) Inventors: Larry Williams, Los Angeles, CA (US); Michael F. Young, Falls Church, VA (US)

(73) Assignee: A.L. Air Data, Los Angeles, CA (US)

( * ) Notice: Subject to any disclaimer, the term of this patent is extended or adjusted under 35 U.S.C. 154(b) by 0 days.

(21) Appl. No.: 09/576,545

(22) Filed: May 22, 2000

Related U.S. Application Data

(62) Division of application No. 09/465,795, filed on Dec. 17, 1999, which is a division of application No. 08/838,303, filed on Apr. 16, 1997, now Pat. No. 6,035,266.

(51) Int. Cl.[7] .................................................. H04L 29/02

(52) U.S. Cl. ......................... 702/188; 315/129; 455/61; 340/870.16

(58) Field of Search ................................ 340/635, 641, 340/644, 653, 657, 825.06, 825.07, 825.16, 825.71, 825.72; 455/66, 561, 352, 353; 702/188; 315/129, 149, 150; 370/310, 916

(56) References Cited

U.S. PATENT DOCUMENTS

| | | | | |
|---|---|---|---|---|
| 3,584,222 A | | 6/1971 | Nesbitt | 250/214 |
| 3,727,063 A | | 4/1973 | Turner | 250/206 |
| 3,828,334 A | | 8/1974 | Wallace | 340/251 |
| 3,900,763 A | | 8/1975 | Turner | 315/156 |
| 4,008,415 A | | 2/1977 | De Avila-Serafin et al. | 315/156 |
| 4,406,995 A | | 9/1983 | May | 340/539 |
| 4,479,246 A | | 10/1984 | Young | 455/50 |
| 4,551,719 A | | 11/1985 | Carlin et al. | 340/825.36 |
| 4,580,099 A | | 4/1986 | Zetti | 324/414 |
| 4,614,945 A | | 9/1986 | Brunisu et al. | 340/870.03 |
| 4,665,321 A | | 5/1987 | Chang et al. | 307/10 |
| 4,691,341 A | | 9/1987 | Knoble et al. | 379/97 |
| 4,718,079 A | | 1/1988 | Rabito | 379/2 |
| 4,808,982 A | | 2/1989 | Knapp | 340/641 |
| 4,810,936 A | | 3/1989 | Nuckols et al. | 315/119 |
| 4,939,505 A | | 7/1990 | Cappellini et al. | 340/642 |
| 4,968,978 A | | 11/1990 | Stolarczyk | 340/854 |
| 5,095,502 A | | 3/1992 | Finzel | 379/40 |
| 5,122,948 A | * | 6/1992 | Zapolin | 364/131 |
| 5,132,596 A | | 7/1992 | Walters et al. | 315/159 |
| 5,194,860 A | | 3/1993 | Jones et al. | 340/370.02 |
| 5,195,016 A | | 3/1993 | Powers | 361/175 |
| 5,254,908 A | * | 10/1993 | Alt et al. | 315/312 |
| 5,387,909 A | | 2/1995 | Neel et al. | 340/931 |

(List continued on next page.)

FOREIGN PATENT DOCUMENTS

| | | | |
|---|---|---|---|
| EP | 91870118.6 | 2/1992 | H05B/37/03 |
| GB | 8515144 | 12/1986 | G08B/19/00 |
| KR | 9409501 | 10/1994 | H04B/37/02 |
| WO | WO 90/04242 | 4/1990 | G08G/5/00 |

OTHER PUBLICATIONS

Tsang et al., "Development of a Distributive Lighting Control System Using Local Operating Network," IEEE, Nov. 1994.

Internet Web page at www.sentor.cc entitled "Sentor Remote Communications Base Site Monitoring & Control Systems," date unknown.

*Primary Examiner*—Patrick Assouad
(74) *Attorney, Agent, or Firm*—Fleshner & Kim, LLP

(57) ABSTRACT

A system and method for remotely monitoring and/or controlling an apparatus and specifically for remotely monitoring and/or controlling street lamps. The lamp monitoring and control system comprises lamp monitoring and control units, each coupled to a respective lamp to monitor and control, and each transmitting monitoring data having at least an ID field and a status field; and at least one base station, coupled to a group of the lamp monitoring and control units, for receiving the monitoring data, wherein each of the base stations includes an ID and status processing unit for processing the ID field of the monitoring data.

20 Claims, 21 Drawing Sheets

U.S. PATENT DOCUMENTS

| | | | | | |
|---|---|---|---|---|---|
| 5,397,963 | A | | 3/1995 | Manson | 315/129 |
| 5,461,365 | A | | 10/1995 | Schlager et al. | 340/573 |
| 5,479,159 | A | | 12/1995 | Kelly et al. | 340/825.08 |
| 5,487,088 | A | | 1/1996 | Weltz et al. | 315/276 |
| 5,568,135 | A | * | 10/1996 | Shinozaki | 340/825.06 |
| 5,586,050 | A | | 12/1996 | Makel et al. | 364/509 |
| 5,598,456 | A | | 1/1997 | Feinberg | 379/42 |
| 5,650,770 | A | | 7/1997 | Schlager et al. | 340/573 |
| 5,656,917 | A | * | 8/1997 | Theobald | 320/22 |
| 5,668,537 | A | | 9/1997 | Chansky et al. | 340/825.06 |
| 5,675,371 | A | * | 10/1997 | Barringer | 348/6 |
| 5,718,234 | A | * | 2/1998 | Warden et al. | 128/696 |
| 5,726,644 | A | * | 3/1998 | Jednacz et al. | 340/825.52 |
| 5,739,640 | A | | 4/1998 | Noble | 315/119 |
| 5,748,104 | A | * | 5/1998 | Argyroudis et al. | 340/870.11 |
| 5,787,149 | A | * | 7/1998 | Yousefi et al. | 379/59 |
| 5,801,643 | A | | 9/1998 | Williams et al. | 340/870.02 |
| 5,818,336 | A | * | 10/1998 | Varga et al. | 340/545 |
| 5,838,226 | A | | 11/1998 | Houggy et al. | 340/310.01 |
| 5,898,384 | A | | 4/1999 | Alt et al. | 340/825.36 |
| 5,907,491 | A | | 5/1999 | Canada et al. | 364/468.15 |
| 5,926,115 | A | | 7/1999 | Schleder et al. | 340/953 |
| 5,943,630 | A | * | 8/1999 | Busby et al. | 702/3 |
| 5,953,368 | A | | 9/1999 | Sanderford et al. | 375/206 |
| 5,962,991 | A | * | 10/1999 | Levy | 315/312 |
| 5,963,146 | A | * | 10/1999 | Johnson et al. | 340/870.01 |
| 6,028,396 | A | | 2/2000 | Morrissey, Jr. et al. | 315/119 |
| 6,035,266 | A | | 3/2000 | Williams et al. | 702/188 |
| 6,072,984 | A | * | 6/2000 | Barringer | 455/6.1 |
| 6,075,451 | A | * | 6/2000 | Lebowitz et al. | 340/825.06 |
| 6,108,614 | A | * | 8/2000 | Lincoln et al. | 702/183 |
| 6,122,527 | A | * | 9/2000 | Robinson et al. | 455/557 |
| 6,154,648 | A | * | 11/2000 | Comer | 455/426 |
| 6,172,616 | B1 | * | 1/2001 | Johnson et al. | 340/870.12 |
| 6,174,073 | B1 | * | 1/2001 | Regan et al. | 362/251 |
| 6,198,390 | B1 | * | 3/2001 | Schlager et al. | 340/540 |
| 6,204,615 | B1 | * | 3/2001 | Levy | 315/312 |

* cited by examiner

High-pressure mercury-vapor lamp

IVDS RADIO CHANNELS

| CHANNEL | FREQUENCY (GROUP A) | FREQUENCY (GROUP B) |
|---|---|---|
| 1 | 218.025 | 218.525 |
| 2 | 218.050 | 218.550 |
| 3 | 218.075 | 218.575 |
| 4 | 218.100 | 218.600 |
| 5 | 218.125 | 218.625 |
| 6 | 218.150 | 218.650 |
| 7 | 218.175 | 218.675 |
| 8 | 218.200 | 218.700 |
| 9 | 218.225 | 218.725 |
| 10 | 218.250 | 218.750 |
| 11 | 218.275 | 218.775 |
| 12 | 218.300 | 218.800 |
| 13 | 218.325 | 218.825 |
| 14 | 218.350 | 218.850 |
| 15 | 218.375 | 218.875 |
| 16 | 218.400 | 218.900 |
| 17 | 218.425 | 218.925 |
| 18 | 218.450 | 218.950 |
| 19 | 218.475 | 218.975 |

FIG. 8

STATUS BYTE TABLE

| BIT LOCATION | DESCRIPTION |
|---|---|
| MSB 7 | ERROR |
| 6 | UNUSED |
| 5 | UNUSED |
| 4 | UNUSED |
| 3 | UNUSED |
| 2 | UNUSED |
| 1 | DAYLIGHT PRESENT |
| LSB 0 | AC ON TO LAMP |

FIG. 10

LAMP MONITORING AND CONTROL SYSTEM AND METHOD

This application is a Divisional of Application No. 08/838,303 filed Apr. 16, 1997, now U.S. Pat. No. 6,035,266 which issued Mar. 7, 2000 and Application No. 09/465,795 which was filed Dec. 17, 1999.

BACKGROUND OF THE INVENTION

1. Field of the Invention

This invention relates generally to a system and method for remotely monitoring and/or controlling an apparatus and specifically to a lamp monitoring and control system and method for use with street lamps. The present invention includes a monitoring and control unit, such as the lamp monitoring and control unit disclosed in co-pending application entitled "LAMP MONITORING AND CONTROL UNIT AND METHOD", Ser. No. 08/838,302, now U.S. Pat. No. 6,119,076, the contents of which are incorporated herein by reference.

2. Background of the Related Art

The first street lamps were used in Europe during the latter half of the seventeenth century. These lamps consisted of lanterns which were attached to cables strung across the street so that the lantern hung over the center of the street. In France, the police were responsible for operating and maintaining these original street lamps while in England contractors were hired for street lamp operation and maintenance. In all instances, the operation and maintenance of street lamps was considered a government function.

The operation and maintenance of street lamps, or more generally any units which are distributed over a large geographic area, can be divided into two tasks: monitor and control. Monitoring comprises the transmission of information from the distributed unit regarding the unit's status and controlling comprises the reception of information by the distributed unit.

For the present example in which the distributed units are street lamps, the monitoring function comprises periodic checks of the street lamps to determine if they are functioning properly. The controlling function comprises turning the street lamps on at night and off during the day.

This monitor and control function of the early street lamps was very labor intensive since each street lamp had to be individually lit (controlled) and watched for any problems (monitored). Because these early street lamps were simply lanterns, there was no centralized mechanism for monitor and control and both of these functions were distributed at each of the street lamps.

Eventually, the street lamps were moved from the cables hanging over the street to poles which were mounted at the side of the street. Additionally, the primitive lanterns were replaced with oil lamps.

The oil lamps were a substantial improvement over the original lanterns because they produced a much brighter light. This resulted in illumination of a greater area by each street lamp. Unfortunately, these street lamps still had the same problem as the original lanterns in that there was no centralized monitor and control mechanism to light the street lamps at night and watch for problems.

In the 1840's, the oil lamps were replaced by gaslights in France. The advent of this new technology began a government centralization of a portion of the control function for street lighting since the gas for the lights was supplied from a central location.

In the 1880's, the gaslights were replaced with electrical lamps. The electrical power for these street lamps was again provided from a central location. With the advent of electrical street lamps, the government finally had a centralized method for controlling the lamps by controlling the source of electrical power.

The early electrical street lamps were composed of arc lamps in which the illumination was produced by an arc of electricity flowing between two electrodes.

Currently, most street lamps still use arc lamps for illumination. The mercury-vapor lamp is the most common form of street lamp in use today. In this type of lamp, the illumination is produced by an arc which takes place in a mercury vapor.

FIG. 1 shows the configuration of a typical mercury-vapor lamp. This figure is provided only for demonstration purposes since there are a variety of different types of mercury-vapor lamps.

The mercury-vapor lamp consists of an arc tube 110 which is filled with argon gas and a small amount of pure mercury. Arc tube 110 is mounted inside a large outer bulb 120 which encloses and protects the arc tube. Additionally, the outer bulb may be coated with phosphors to improve the color of the light emitted and reduce the ultraviolet radiation emitted. Mounting of arc tube 110 inside outer bulb 120 may be accomplished with an arc tube mount support 130 on the top and a stem 140 on the bottom.

Main electrodes 150*a* and 150*b*, with opposite polarities, are mechanically sealed at both ends of arc tube 110. The mercury-vapor lamp requires a sizeable voltage to start the arc between main electrodes 150*a* and 150*b*.

The starting of the mercury-vapor lamp is controlled by a starting circuit (not shown in FIG. 1) which is attached between the power source (not shown in FIG. 1) and the lamp. Unfortunately, there is no standard starting circuit for mercury-vapor lamps. After the lamp is started, the lamp current will continue to increase unless the starting circuit provides some means for limiting the current. Typically, the lamp current is limited by a resistor, which severely reduces the efficiency of the circuit, or by a magnetic device, such as a choke or a transformer, called a ballast.

During the starting operation, electrons move through a starting resistor 160 to a starting electrode 170 and across a short gap between starting electrode 170 and main electrode 150*b* of opposite polarity. The electrons cause ionization of some of the Argon gas in the arc tube. The ionized gas diffuses until a main arc develops between the two opposite polarity main electrodes 150*a* and 150*b*. The heat from the main arc vaporizes the mercury droplets to produce ionized current carriers. As the lamp current increases, the ballast acts to limit the current and reduce the supply voltage to maintain stable operation and extinguish the arc between main electrode 150*b* and starting electrode 170.

Because of the variety of different types of starter circuits, it is virtually impossible to characterize the current and voltage characteristics of the mercury-vapor lamp. In fact, the mercury-vapor lamp may require minutes of warm-up before light is emitted. Additionally, if power is lost, the lamp must cool and the mercury pressure must decrease before the starting arc can start again.

The mercury-vapor lamp has become one of the predominant types of street lamp with millions of units produced annually. The current installed base of these street lamps is enormous with more than 500,000 street lamps in Los Angeles alone. The mercury-vapor lamp is not the most efficient gaseous discharge lamp, but is preferred for use in street lamps because of its long life, reliable performance, and relatively low cost.

Although the mercury-vapor lamp has been used as a common example of current street lamps, there is increasing use of other types of lamps such as metal halide and high pressure sodium. All of these types of lamps require a starting circuit which makes it virtually impossible to characterize the current and voltage characteristics of the lamp.

FIG. 2 shows a lamp arrangement 201 with a typical lamp sensor unit 210 which is situated between a power source 220 and a lamp assembly 230. Lamp assembly 230 includes a lamp 240 (such as the mercury-vapor lamp presented in FIG. 1) and a starting circuit 250.

Most cities currently use automatic lamp control units to control the street lamps. These lamp control units provide an automatic, but decentralized, control mechanism for turning the street lamps on at night and off during the day.

A typical street lamp assembly 201 includes a lamp sensor unit 210 which in turn includes a light sensor 260 and a relay 270 as shown in FIG. 2. Lamp sensor unit 210 is electrically coupled between external power source 220 and starting circuit 250 of lamp assembly 230. There is a hot line 280a and a neutral line 280b providing electrical connection between power source 220 and lamp sensor unit 210. Additionally, there is a switched line 280*c* and a neutral line 280*d* providing electrical connection between lamp sensor unit 210 and starting circuit 250 of lamp assembly 230.

From a physical standpoint, most lamp sensor units 210 use a standard three prong plug, for example a twist lock plug, to connect to the back of lamp assembly 230. The three prongs couple to hot line 280*a*, switched line 280*c*, and neutral lines 280*b* and 280*d*. In other words, the neutral lines 280*b* and 280*d* are both connected to the same physical prong since they are at the same electrical potential. Some systems also have a ground wire, but no ground wire is shown in FIG. 2 since it is not relevant to the operation of lamp sensor unit 210.

Power source 220 may be a standard 115 Volt, 60 Hz source from a power line. Of course, a variety of alternatives are available for power source 220. In foreign countries, power source 220 may be a 220 Volt, 50 Hz source from a power line. Additionally, power source 220 may be a DC voltage source or, in certain remote regions, it may be a battery which is charged by a solar reflector.

The operation of lamp sensor unit 210 is fairly simple. At sunset, when the light from the sun decreases below a sunset threshold, light sensor 260 detects this condition and causes relay 270 to close. Closure of relay 270 results in electrical connection of hot line 280*a* and switched line 280*c* with power being applied to starting circuit 250 of lamp assembly 230 to ultimately produce light from lamp 240. At sunrise, when the light from the sun increases above a sunrise threshold, light sensor 260 detects this condition and causes relay 270 to open. Opening of relay 270 eliminates electrical connection between hot line 280*a* and switched line 280*c* and causes the removal of power from starting circuit 250 which turns lamp 240 off.

Lamp sensor unit 210 provides an automated, distributed control mechanism to turn lamp assembly 230 on and off. Unfortunately, it provides no mechanism for centralized monitoring of the street lamp to determine if the lamp is functioning properly. This problem is particularly important in regard to the street lamps on major boulevards and highways in large cities. When a street lamp burns out over a highway, it is often not replaced for a long period of time because the maintenance crew will only schedule a replacement lamp when someone calls the city maintenance department and identifies the exact pole location of the bad lamp. Since most automobile drivers will not stop on the highway just to report a bad street lamp, a bad lamp may go unreported indefinitely.

Additionally, if a lamp is producing light but has a hidden problem, visual monitoring of the lamp will never be able to detect the problem. Some examples of hidden problems relate to current, when the lamp is drawing significantly more current than is normal, or voltage, when the power supply is not supplying the appropriate voltage level to the street lamp.

Furthermore, the present system of lamp control in which an individual light sensor is located at each street lamp, is a distributed control system which does not allow for centralized control. For example, if the city wanted to turn on all of the street lamps in a certain area at a certain time, this could not be done because of the distributed nature of the present lamp control circuits.

Because of these limitations, a new type of lamp monitoring and control system is needed which allows centralized monitoring and/or control of the street lamps in a geographical area.

One attempt to produce a centralized control mechanism is a product called the RadioSwitch made by Cetronic. The RadioSwitch is a remotely controlled time switch for installation on the DIN-bar of control units. It is used for remote control of electrical equipment via local or national paging networks. Unfortunately, the RadioSwitch is unable to address most of the problems listed above.

Since the RadioSwitch is receive only (no transmit capability), it only allows one to remotely control external equipment. Furthermore, since the communication link for the RadioSwitch is via paging networks, it is unable to operate in areas in which paging does not exist (for example, large rural areas in the United States). Additionally, although the RadioSwitch can be used to control street lamps, it does not use the standard three prong interface used by the present lamp control units. Accordingly, installation is difficult because it cannot be used as a plug-in replacement for the current lamp control units.

Because of these limitations of the available equipment, there exists a need for a new type of lamp monitoring and control system which allows centralized monitoring and/or control of the street lamps in a geographical area. More specifically, this new system must be inexpensive, reliable, and able to handle the traffic generated by communication with the millions of currently installed street lamps.

Although the above discussion has presented street lamps as an example, there is a more general need for a new type of monitoring and control system which allows centralized monitoring and/or control of units distributed over a large geographical area.

The above references are incorporated by reference herein where appropriate for appropriate teachings of additional or alternative details, features and/or technical background.

SUMMARY OF THE INVENTION

The present invention provides a lamp monitoring and control system and method for use with street lamps which solves the problems described above.

While the invention is described with respect to use with street lamps, it is more generally applicable to any application requiring centralized monitoring and/or control of units distributed over a large geographical area.

Accordingly, an object of the present invention is to provide a system for monitoring and controlling lamps or any remote device over a large geographical area.

Another object of the invention is to provide a method for randomizing transmit times and channel numbers to reduce the probability of a packet collision.

An additional object of the present invention is to provide a base station for receiving monitoring data from remote devices.

Another object of the current invention is to provide an ID and status processing unit in the base station for processing an ID and status field in the monitoring data and allowing storage in a database to create statistical profiles.

An advantage of the present invention is that it solves the problem of efficiently providing centralized monitoring and/or control of the street lamps in a geographical area.

Another advantage of the present invention is that by randomizing the frequency and timing of redundant transmissions, it reduces the probability of collisions while increasing the probability of a successful packet reception.

An additional advantage of the present invention is that it provides for a new type of monitoring and control unit which allows centralized monitoring and/or control of units distributed over a large geographical area.

Another advantage of the present invention is that it allows bases stations to be connected to other base stations or to a main station in a network topology to increase the amount of monitoring data in the overall system.

A feature of the present invention, in accordance with one embodiment, is that it includes the base station with an ID and status processing unit for processing the ID field of the monitoring data.

Another feature of the present invention is that in accordance with an embodiment, the monitoring data further includes a data field which can store current or voltage data in a lamp monitoring and control system.

An additional feature of the present invention, in accordance with another embodiment, is that it includes remote device monitoring and control units which can be linked to the bases station via RF, wire, coaxial cable, or fiber optics.

These and other objects, advantages and features can be accomplished in accordance with the present invention by the provision of a lamp monitoring and control system comprising lamp monitoring and control units, each coupled to a respective lamp to monitor and control, and each transmitting monitoring data having at least an ID field and a status field; and at least one base station, coupled to a group of the lamp monitoring and control units, for receiving the monitoring data, wherein each of the base stations includes an ID and status processing unit for processing the ID field of the monitoring data.

These and other objects, advantages and features can additionally be accomplished in accordance with the present invention by the provision of a remote device monitoring and control system comprising remote device monitoring and control units, each coupled to a respective remote device to monitor and control, and each transmitting monitoring data having at least an ID field and a status field; and at least one base station, coupled to a group of the remote device monitoring and control units, for receiving the monitoring data, wherein each of the base stations includes an ID and status processing unit for processing the ID field of the monitoring data.

These and other objects, advantages and features can also be accomplished in accordance with the present invention by the provision of a method for monitoring the status of lamps, comprising the steps of collecting monitoring data for the lamps and transmitting the monitoring data.

Additional objects, advantages, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 8 shows an example frequency channel plan for a monitoring and control system, according to another embodiment of the invention.

FIG. 10 shows an example of bit location values for a status byte in the packet format, according to another embodiment of the invention.

DETAILED DESCRIPTION OF PREFERRED EMBODIMENTS

The preferred embodiments of a lamp monitoring and control system (LMCS) and method, which allows centralized monitoring and/or control of street lamps, will now be described with reference to the accompanying figures. While the invention is described with reference to an LMCS, the invention is not limited to this application and can be used in any application which requires a monitoring and control system for centralized monitoring and/or control of devices distributed over a large geographical area. Additionally, the term street lamp in this disclosure is used in a general sense to describe any type of street lamp, area lamp, or outdoor lamp.

Figure 1:
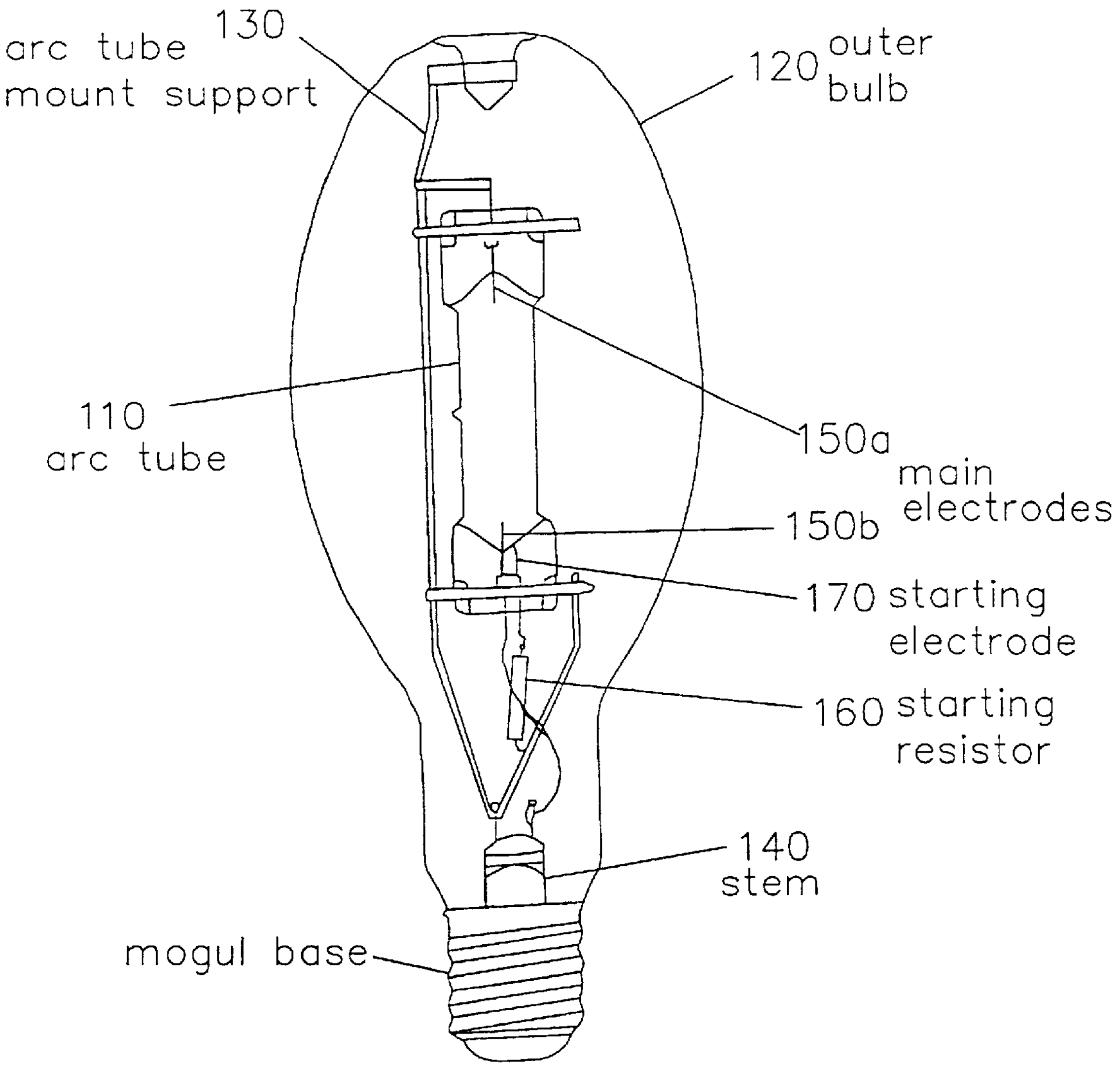
FIG. 1 shows the configuration of a typical mercury-vapor lamp.
Figure 2:
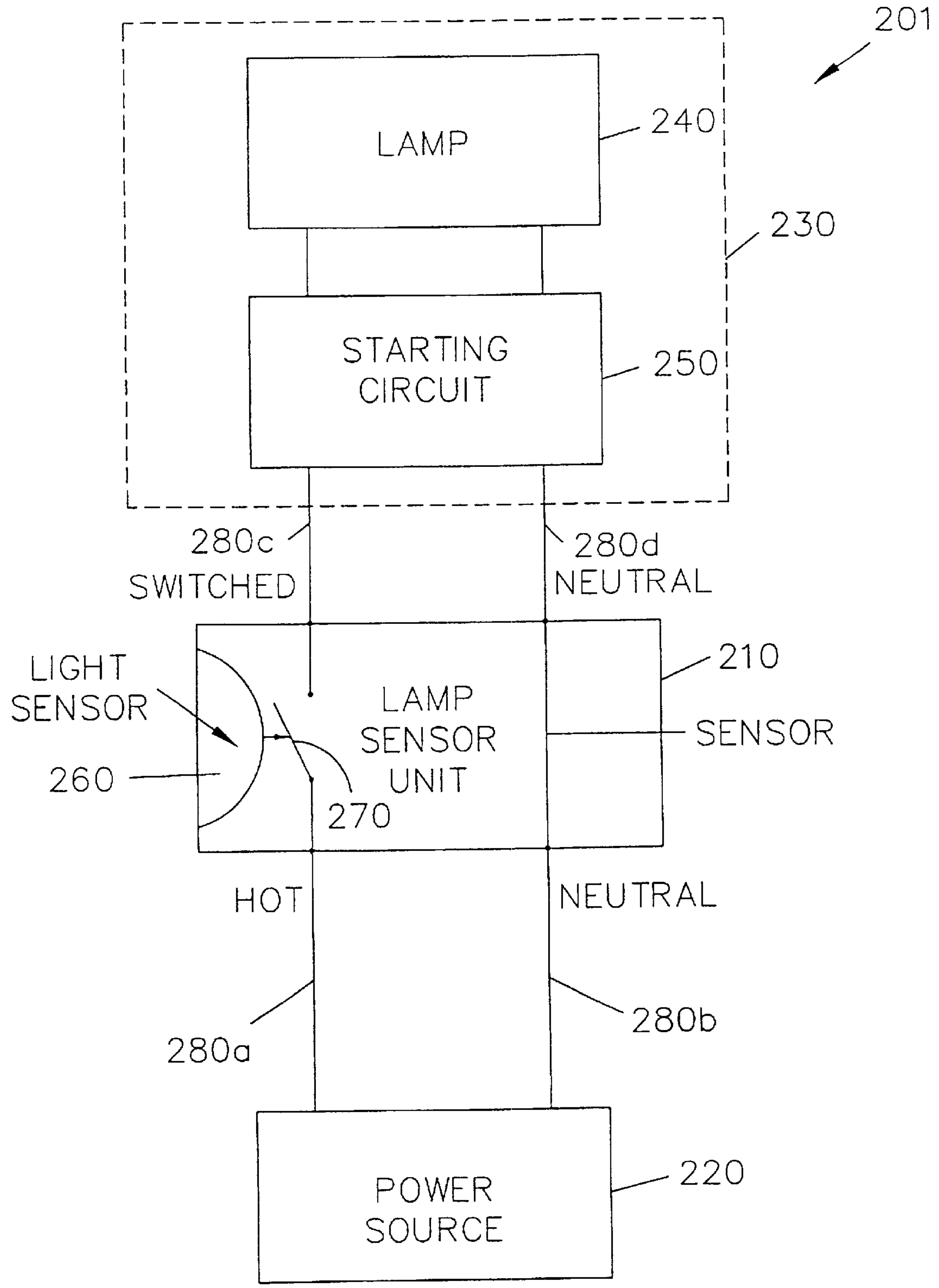
FIG. 2 shows a typical configuration of a lamp arrangement comprising a lamp sensor unit situated between a power source and a lamp assembly.
Figure 3:
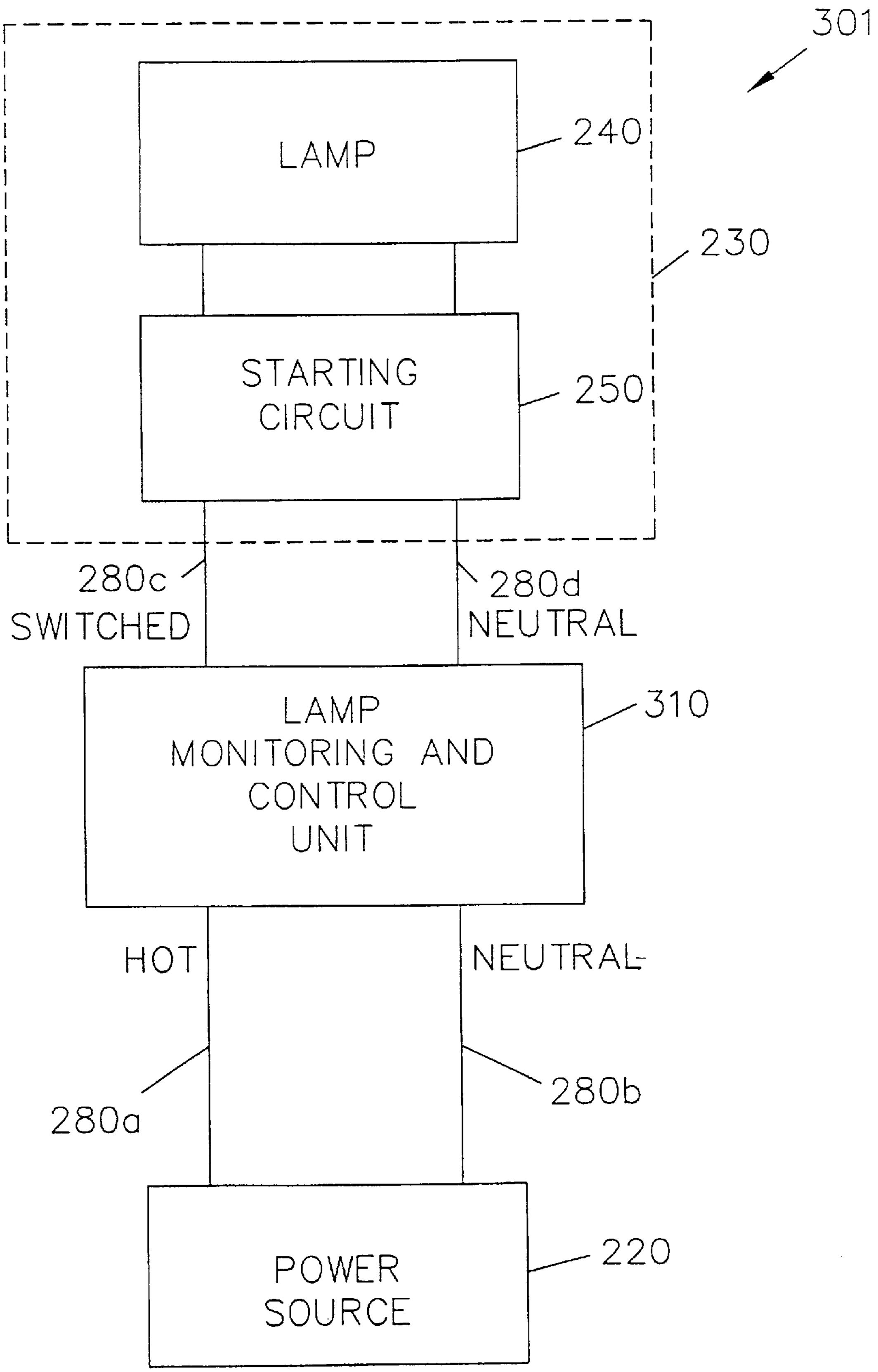
FIG. 3 shows a lamp arrangement, according to one embodiment of the invention, comprising a lamp monitoring and control unit situated between a power source and a lamp assembly.

FIG. 3 shows a lamp arrangement 301 which includes lamp monitoring and control unit 310, according to one embodiment of the invention. Lamp monitoring and control unit 310 is situated between a power source 220 and a lamp assembly 230. Lamp assembly 230 includes a lamp 240 and a starting circuit 250.

Power source 220 may be a standard 115 volt, 60 Hz source supplied by a power line. It is well known to those skilled in the art that a variety of alternatives are available for power source 220. In foreign countries, power source 220 may be a 220 volt, 50 Hz source from a power line. Additionally, power source 220 may be a DC voltage source or, in certain remote regions, it may be a battery which is charged by a solar reflector.

Recall that lamp sensor unit 210 included a light sensor 260 and a relay 270 which is used to control lamp assembly 230 by automatically switching the hot line 280*a* to a switched line 280*c* depending on the amount of ambient light received by light sensor 260.

On the other hand, lamp monitoring and control unit 310 provides several functions including a monitoring function which is not provided by lamp sensor unit 210. Lamp monitoring and control unit 310 is electrically located between the external power supply 220 and starting circuit 250 of lamp assembly 230. From an electrical standpoint, there is a hot line 280*a* and a neutral line 280*b* between power supply 220 and lamp monitoring and control unit 310. Additionally, there is a switched line 280*c* and a neutral line 280*d* between lamp monitoring and control unit 310 and starting circuit 250 of lamp assembly 230.

From a physical standpoint, lamp monitoring and control unit 310 may use a standard three-prong plug to connect to the back of lamp assembly 230. The three prongs in the standard three-prong plug represent hot line 280*a*, switched line 280*c*, and neutral lines 280*b* and 280*d*. In other words, the neutral lines 280*b* and 280*d* are both connected to the same physical prong and share the same electrical potential.

Although use of a three-prong plug is recommended because of the substantial number of street lamps using this type of standard plug, it is well known to those skilled in the art that a variety of additional types of electrical connection may be used for the present invention. For example, a standard power terminal block or AMP power connector may be used.

Figure 4:
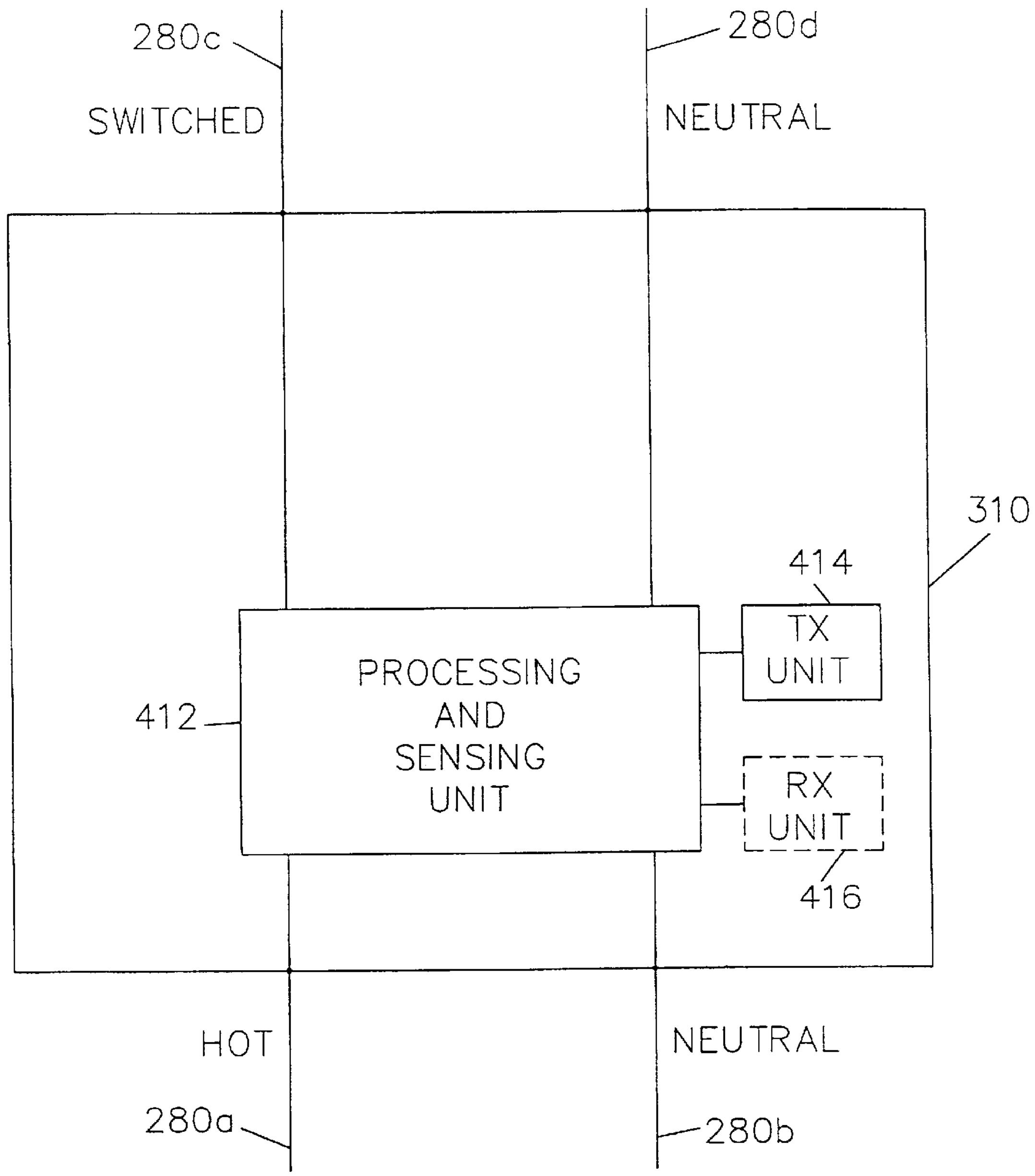
FIG. 4 shows a lamp monitoring and control unit, according to another embodiment of the invention, including a processing and sensing unit, a TX unit, and an RX unit.

FIG. 4 includes lamp monitoring and control unit 310, the operation of which will be discussed in more detail below along with particular embodiments of the unit. Lamp monitoring and control unit 310 includes a processing and sensing unit 412, a transmit (TX) unit 414, and an optional receive (RX) unit 416. Processing and sensing unit 412 is electrically connected to hot line 280*a*, switched line 280*c*, and neutral lines 280*b* and 280*d*. Furthermore, processing and sensing unit 412 is connected to TX unit 414 and RX unit 416. In a standard application, TX unit 414 may be used to transmit monitoring data and RX unit 416 may be used to receive control information. For applications in which external control information is not required, RX unit 416 may be omitted from lamp monitoring and control unit 310.

Figure 5:
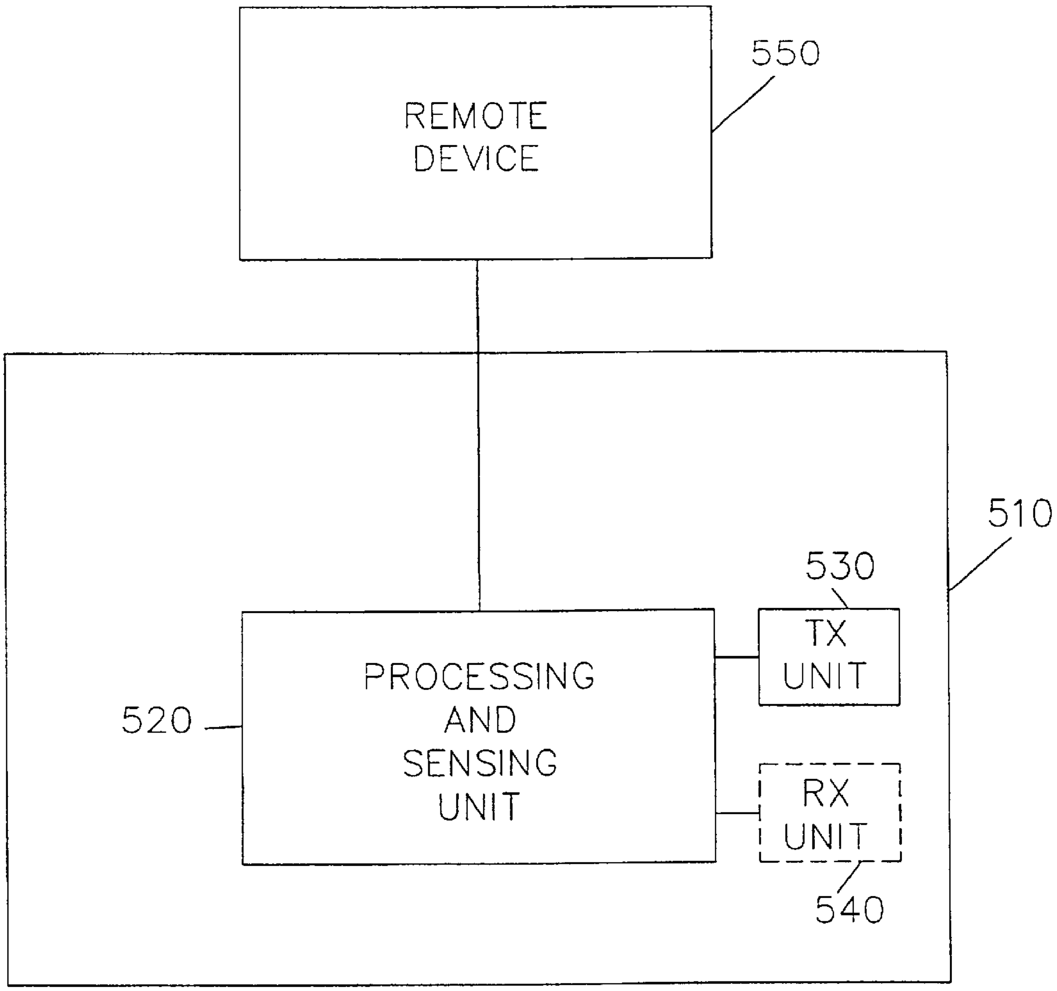
FIG. 5 shows a general monitoring and control unit, according to another embodiment of the invention, including a processing and sensing unit, a TX unit, and an RX unit.

FIG. 5 shows a general monitoring and control unit 510 including a processing and sensing unit 520, a TX unit 530, and an optional RX unit 540. Monitoring and control unit 510 differs from lamp monitoring and control unit 310 in that monitoring and control unit 510 is general-purpose and not limited to use with street lamps. Monitoring and control unit 510 can be used to monitor and control any remote device 550.

Monitoring and control unit 510 includes processing and sensing unit 520 which is coupled to remote device 550. Processing and sensing unit 520 is further coupled to TX unit 530 for transmitting monitoring data and may be coupled to an optional RX unit 540 for receiving control information.

Figure 6:
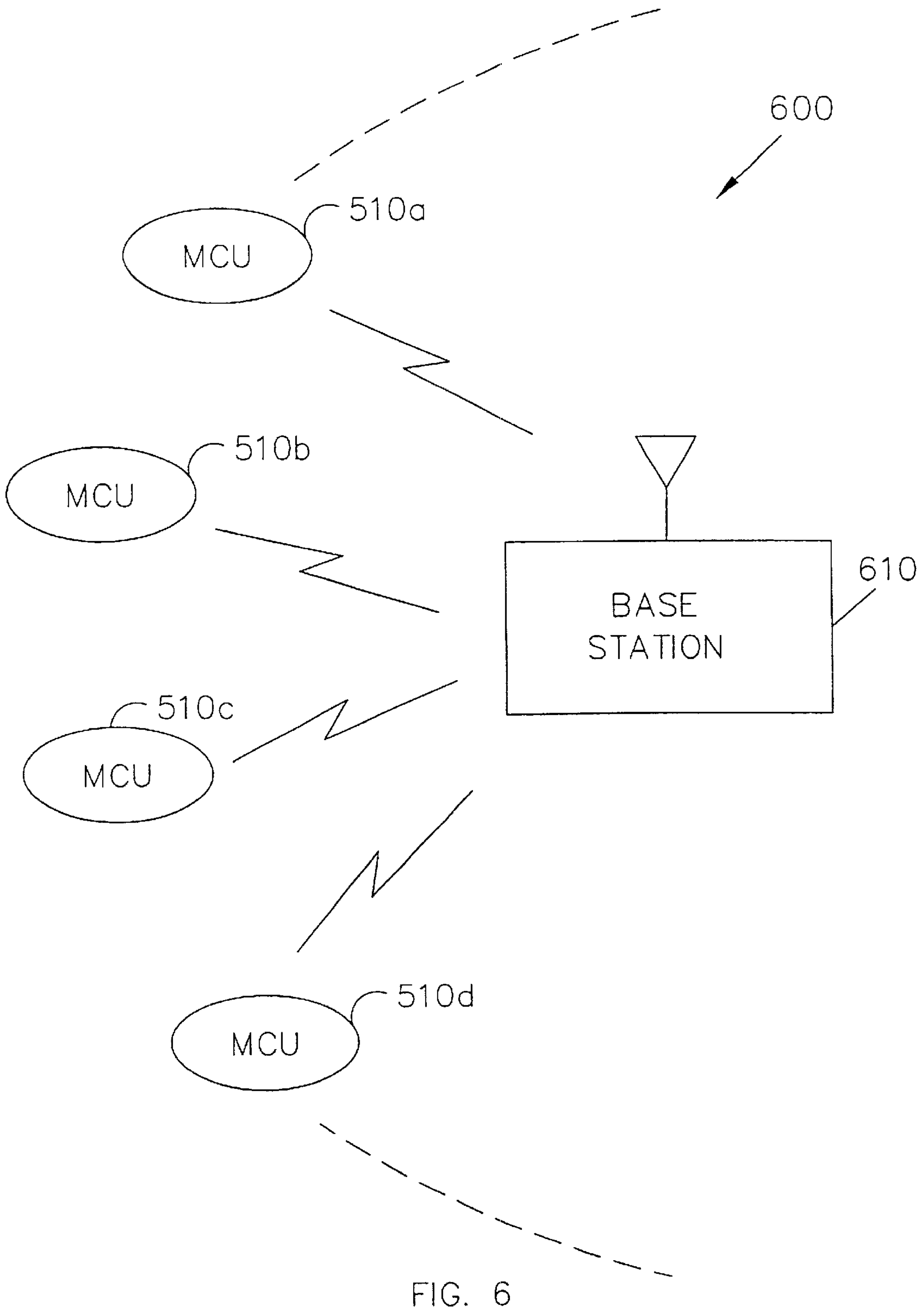
FIG. 6 shows a monitoring and control system, according to another embodiment of the invention, including a base station and a plurality of monitoring and control units.

FIG. 6 shows a monitoring and control system 600, according to one embodiment of the invention, including a base station 610 and a plurality of monitoring and control units 510*a–d*.

Monitoring and control units 510*a–d* each correspond to monitoring and control unit 510 as shown in FIG. 5, and are coupled to a remote device 550 (not shown in FIG. 6) which is monitored and controlled. Each of monitoring and control units 510*a–d* can transmit monitoring data through its associated TX unit 530 to base station 610 and receive control information through a RX unit 540 from base station 610.

Communication between monitoring and control units 510*a–d* and base station 610 can be accomplished in a variety of ways, depending on the application, such as using: RF, wire, coaxial cable, or fiber optics. For lamp monitoring and control system 600, RF is the preferred communication link due to the costs required to build the infrastructure for any of the other options.

Figure 7:
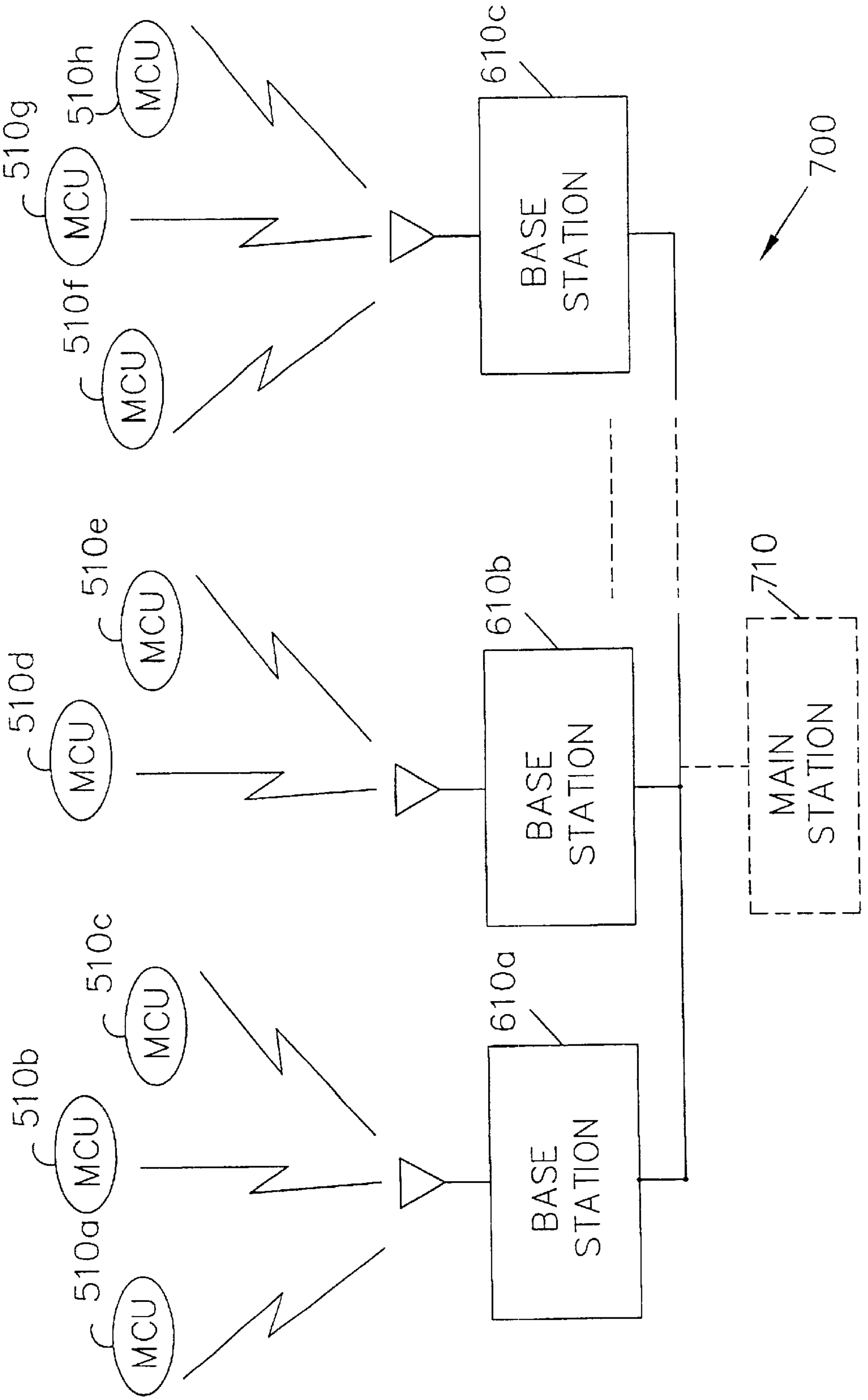
FIG. 7 shows a monitoring and control system, according to another embodiment of the invention, including a plurality of base stations, each having a plurality of associated monitoring and control units.

FIG. 7 shows a monitoring and control system 700, according to another embodiment of the invention, including a plurality of base stations 610*a–c*, each having a plurality of associated monitoring and control units 510*a–h*. Each base station 610*a–c* is generally associated with a particular geographic area of coverage. For example, the first base station 610*a*, communicates with monitoring and control units 510*a–c* in a limited geographic area. If monitoring and control units 510*a–c* are used for lamp monitoring and control, the geographic area may consist of a section of a city.

Although the example of geographic area is used to group monitoring and control units 510*a–c*, it is well known to those skilled in the art that other groupings may be used. For example, to monitor and control remote devices 550 made by different manufacturers, monitoring and control system 700 may use groupings in which base station 610*a* services one manufacturer and base station 610*b* services a different manufacturer. In this example, bases stations 610*a* and 610*b* may be servicing overlapping geographical areas.

FIG. 7 also shows a communication link between base stations 610*a–c*. This communication link is shown as a bus topology, but can alternately be configured in a ring, star, mesh, or other topology. An optional main station 710 can also be connected to the communication link to receive and concentrate data from base stations 610*a–c*. The media used for the communication link between base stations 610*a–c* can be: RF, wire, coaxial cable, or fiber optics.

FIG. 8 shows an example of a frequency channel plan for communications between monitoring and control unit 510 and base station 610 in monitoring and control system 600 or 700, according to one embodiment of the invention. In this example table, interactive video and data service (IVDS) radio frequencies in the range of 218–219 MHz are shown. The IVDS channels in FIG. 8 are divided into two groups, Group A and Group B, with each group having nineteen channels spaced at 25 KHz steps. The first channel of the group A frequencies is located at 218.025 MHz and the first channel of the group B frequencies is located at 218.525 MHz.

Figure 9A:
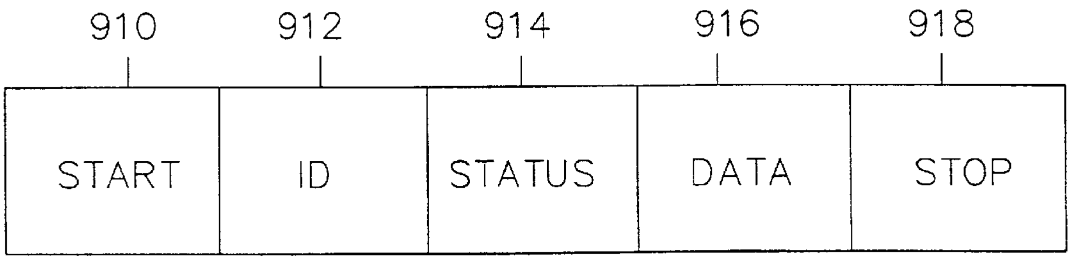
FIGS. 9A–B show packet formats, according to another embodiment of the invention, for packet data between the monitoring and control unit and the base station.
Figure 9B:
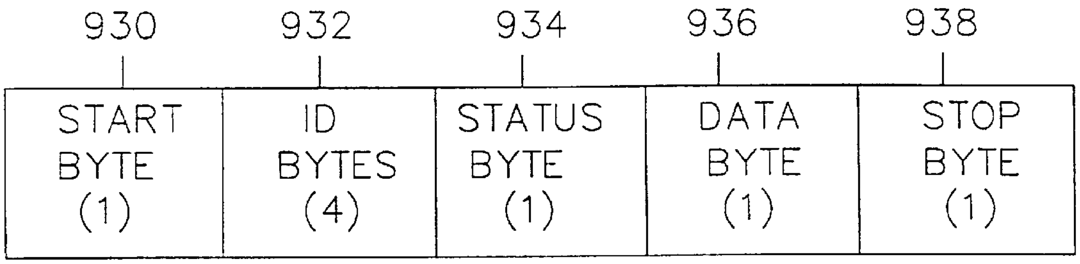

FIGS. 9A–B show packet formats, according to two embodiments of the invention, for packet data transferred between monitoring and control unit 510 and base station 610. FIG. 9A shows a general packet format, according to one embodiment of the invention, including a start field 910, an ID field 912, a status field 914, a data field 916, and a stop field 918.

Start field 910 is located at the beginning of the packet and indicates the start of the packet.

ID field 912 is located after start field 910 and indicates the ID for the source of the packet transmission and optionally the ID for the destination of the transmission. Inclusion of a destination ID depends on the system topology and geographic layout. For example, if an RF transmission is used for the communications link and if base station 610*a* is located far enough from the other base stations so that associated monitoring and control units 510*a–c* are out of range from the other base stations, then no destination ID is required. Furthermore, if the communication link between base station 610*a* and associated monitoring and control units 510*a–c* uses wire or cable rather than RF, then there is also no requirement for a destination ID.

Status field 914 is located after ID field 912 and indicates the status of monitoring and control unit 510. For example, if monitoring and control unit 510 is used in conjunction with street lamps, status field 914 could indicate that the street lamp was turned on or off at a particular time.

Data field 916 is located after status field 914 and includes any data that may be associated with the indicated status. For example, if monitoring and control unit 510 is used in conjunction with street lamps, data field 916 may be used to provide an A/D value for the lamp voltage or current after the street lamp has been turned on.

Stop field 918 is located after data field 916 and indicates the end of the packet.

FIG. 9B shows a more detailed packet format, according to another embodiment of the invention, including a start byte 930, ID bytes 932, a status byte 934, a data byte 936, and a stop byte 938. Each byte comprises eight bits of information.

Start byte 930 is located at the beginning of the packet and indicates the start of the packet. Start byte 930 will use a unique value that will indicate to the destination that a new packet is beginning. For example, start byte 930 can be set to a value such as 02 hex.

ID bytes 932 can be four bytes located after start byte 930 which indicate the ID for the source of the packet transmission and optionally the ID for the destination of the transmission. ID bytes 932 can use all four bytes as a source address which allows for $2^{32}$ (over 4 billion) unique monitoring and control units 510. Alternately, ID bytes 932 can be divided up so that some of the bytes are used for a source ID and the remainder are used for a destination ID. For example, if two bytes are used for the source ID and two bytes are used for the destination ID, the system can include $2^{16}$ (over 64,000) unique sources and destinations.

Status byte 934 is located after ID bytes 932 and indicates the status of monitoring and control unit 510. The status may be encoded in status byte 934 in a variety of ways. For example, if each byte indicates a unique status, then there exists $2^8$ (256) unique status values. However, if each bit of status byte 934 is reserved for a particular status indication, then there exists only 8 unique status values (one for each bit in the byte). Furthermore, certain combinations of bits may be reserved to indicate an error condition. For example, a status byte 934 setting of FF hex (all ones) can be reserved for an error condition.

Data byte 936 is located after status byte 934 and includes any data that may be associated with the indicated status. For example, if monitoring and control unit 510 is used in conjunction with street lamps, data byte 936 may be used to provide an A/D value for the lamp voltage or current after the street lamp has been turned on.

Stop byte 938 is located after data byte 936 and indicates the end of the packet. Stop byte 938 will use a unique value that will indicate to the destination that the current packet is ending. For example, stop byte 938 can be set to a value such as 03 hex.

FIG. 10 shows an example of bit location values for status byte 934 in the packet format, according to another embodiment of the invention. For example, if monitoring and control unit 510 is used in conjunction with street lamps, each bit of the status byte can be used to convey monitoring data.

The bit values are listed in the table with the most significant bit (MSB) at the top of the table and the least significant bit (LSB) at the bottom. The MSB, bit 7, can be used to indicate if an error condition has occurred. Bits 6-2 are unused. Bit 1 indicates whether daylight is present and will be set to 0 when the street lamp is turned on and set to 1 when the street lamp is turned off. Bit 0 indicates whether AC voltage has been switched on to the street lamp. Bit 0 is set to 0 if the AC voltage is off and set to 1 if the AC voltage is on.

Figure 11A:
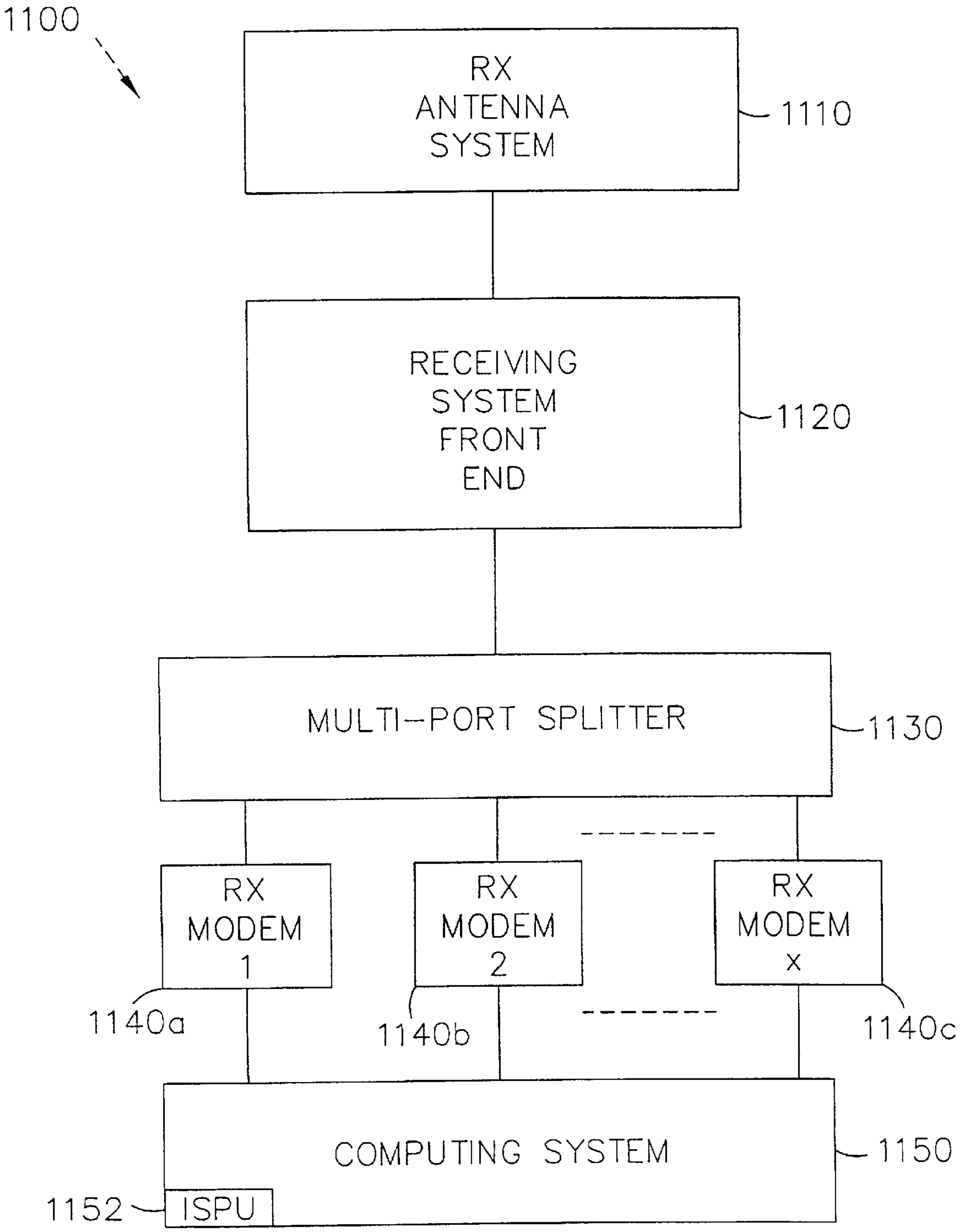
FIGS. 11A–C show a base station for use in a monitoring and control system, according to another embodiment of the invention.
Figure 11B:
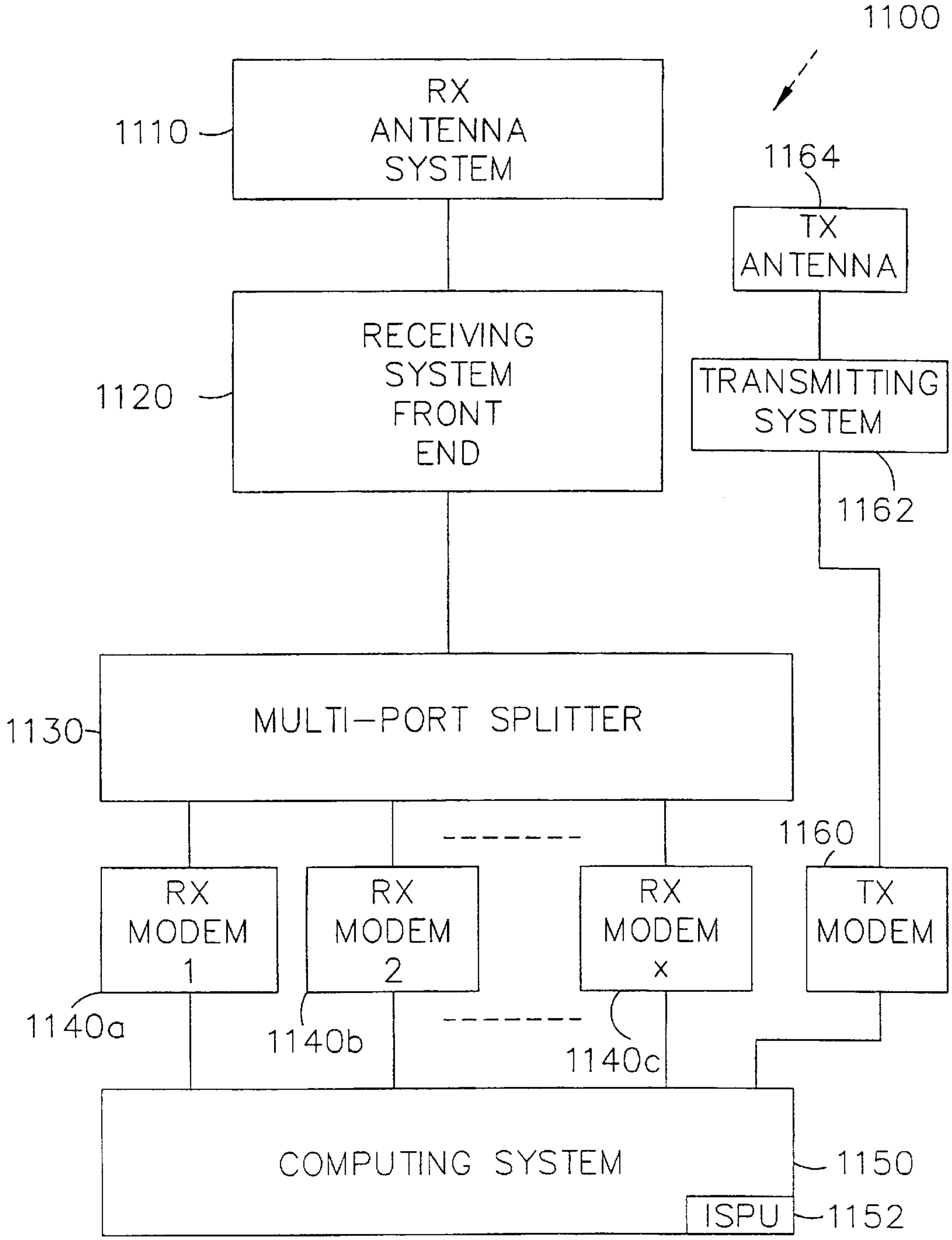
Figure 11C:
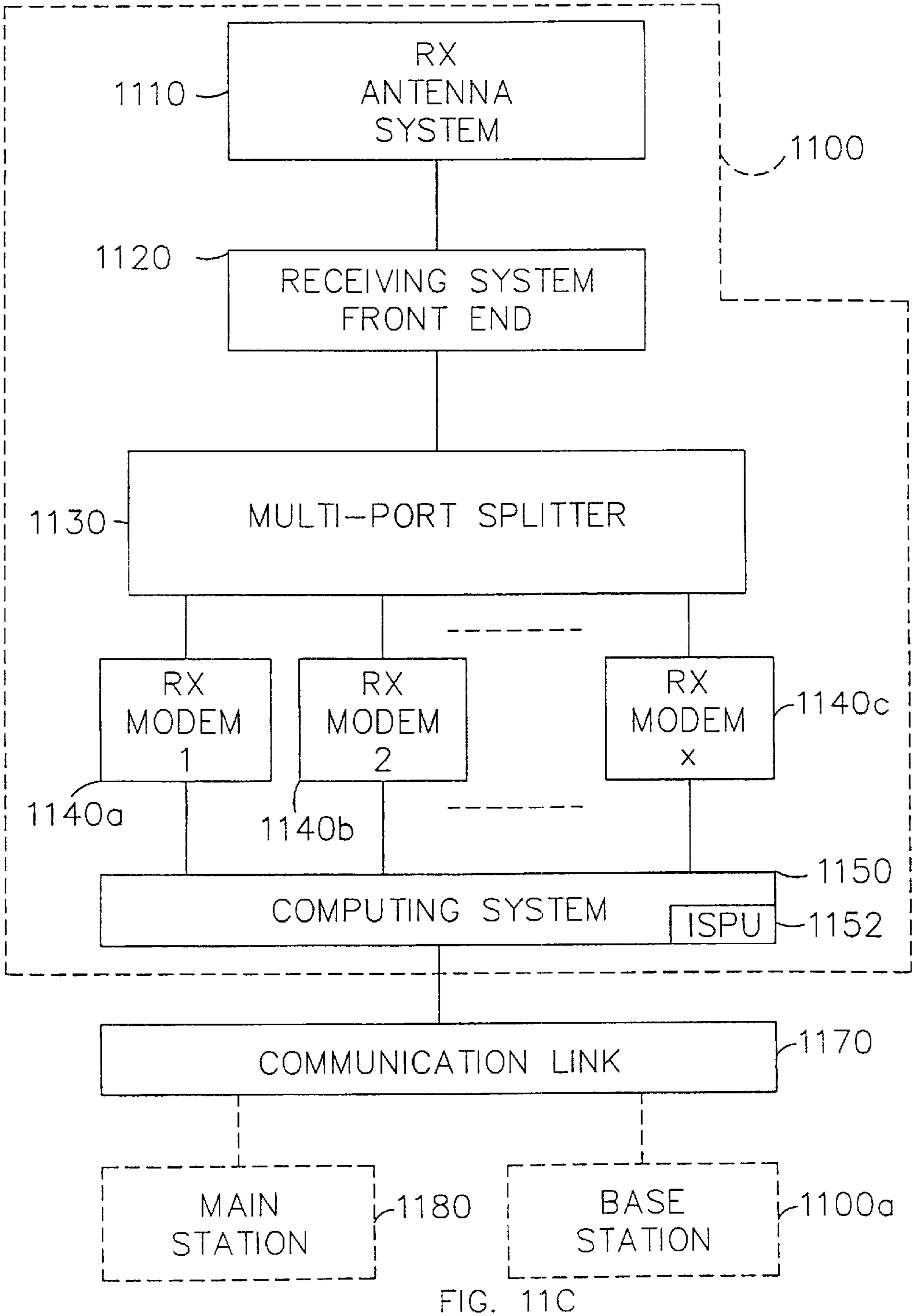

FIGS. 11A–C show a base station 1100 for use in a monitoring and control system using RF, according to another embodiment of the invention.

FIG. 11A shows base station 1100 which includes an RX antenna system 1110, a receiving system front end 1120, a multi-port splitter 1130, a bank of RX modems 1140*a–c*, and a computing system 1150.

RX antenna system 1110 receives RF monitoring data and can be implemented using a single antenna or an array of interconnected antennas depending on the topology of the system. For example, if a directional antenna is used, RX antenna system 1110 may include an array of four of these directional antennas to provide 360 degrees of coverage.

Receiving system front end 1120 is coupled to RX antenna system 1110 for receiving the RF monitoring data. Receiving system front end 1120 can also be implemented in a variety of ways. For example, a low noise amplifier (LNA) and pre-selecting filters can be used in applications which require high receiver sensitivity. Receiving system front end 1120 outputs received RF monitoring data.

Multi-port splitter 1130 is coupled to receiving system front end 1120 for receiving the received RF monitoring data. Multi-port splitter 1130 takes the received RF monitoring data from receiving system front end 1120 and splits it to produce split RF monitoring data.

RX modems 1140*a–c* are coupled to multi-port splitter 1130 and receive the split RF monitoring data. RX modems 1140*a–c* each demodulate their respective split RF monitoring data line to produce a respective received data signal.

RX modems 1140*a–c* can be operated in a variety of ways depending on the configuration of the system. For example, if twenty channels are being used, twenty RX modems 1140 can be used with each RX modem set to a different fixed frequency. On the other hand, in a more sophisticated configuration, frequency channels can be dynamically allocated to RX modems 1140*a–c* depending on the traffic requirements.

Computing system 1150 is coupled to RX modems 1140*a–c* for receiving the received data signals. Computing system 1150 can include one or many individual computers. Additionally, the interface between computing system 1150 and RX modems 1140*a–c* can be any type of data interface, such as RS-232 or RS-422 for example.

Computing system 1150 includes an ID and status processing unit (ISPU) 1152 which processes ID and status data from the packets of monitoring data in the demodulated signals. ISPU 1152 can be implemented as software, hardware, or firmware. Using ISPU 1152, computing system 1150 can decode the packets of monitoring data in the demodulated signals, or can simply pass, without decoding, the packets of monitoring data on to another device, or can both decode and pass the packets of monitoring data.

For example, if ISPU 1152 is implemented as software running on a computer, it can process and decode each packet. Furthermore, ISPU 1152 can include a user interface, such as a graphical user interface, to allow an operator to view the monitoring data. Furthermore, ISPU 1152 can include or interface to a database in which the monitoring data is stored.

The inclusion of a database is particularly useful for producing statistical norms on the monitoring data either relating to one monitoring and control unit over a period of time or relating to performance of all of the monitoring and control units. For example, if the present invention is used for lamp monitoring and control, the current draw of a lamp can be monitored over a period of time and a profile created. Furthermore, an alarm threshold can be set if a new piece of monitored data deviates from the norm established in the profile. This feature is helpful for monitoring and controlling lamps because the precise current characteristics of each lamp can vary greatly. By allowing the database to create a unique profile for each lamp, the problem related to different lamp currents can be overcome so that an automated system for quickly identifying lamp problems is established.

FIG. 11B shows an alternate configuration for base station 1100, according to a further embodiment of the invention, which includes all of the elements discussed in regard to FIG. 11A and further includes a TX modem 1160, transmitting system 1162, and TX antenna 1164. Base station 1100 as shown in FIG. 11B can be used in applications which require a TX channel for control of remote devices 550.

TX modem 1160 is coupled to computing system 1150 for receiving control information. The control information is modulated by TX modem 1160 to produce modulated control information.

Transmitting system 1162 is coupled to TX modem 1160 for receiving the modulated control information. Transmitting system 1162 can have a variety of different configurations depending on the application. For example, if higher transmit power output is required, transmitting system 1162 can include a power amplifier. If necessary, transmitting system 1162 can include isolators, bandpass, lowpass, or highpass filters to prevent out-of-band signals. After receiving the modulated control information, transmitting system 1162 outputs a TX RF signal.

TX antenna 1164 is coupled to transmitting system 1162 for receiving the TX RF signal and transmitting a transmitted TX RF signal. It is well known to those skilled in the art that TX antenna 1164 may be coupled with RX antenna system 1110 using a duplexer for example.

FIG. 11C shows base station 1100 as part of a monitoring and control system, according to another embodiment of the invention. Base station 1100 has already been described with reference to FIG. 11A.

Additionally, computing system 1150 of base station 1100 can be coupled to a communication link 1170 for communicating with a main station 1180 or a further base station 1100*a*.

Communication link 1170 may be implemented using a variety of technologies such as: a standard phone line, DDS line, ISDN line, T1, fiber optic line, or RF link. The topology of communication link 1170 can vary depending on the application and can be: star, bus, ring, or mesh.

Figure 12:
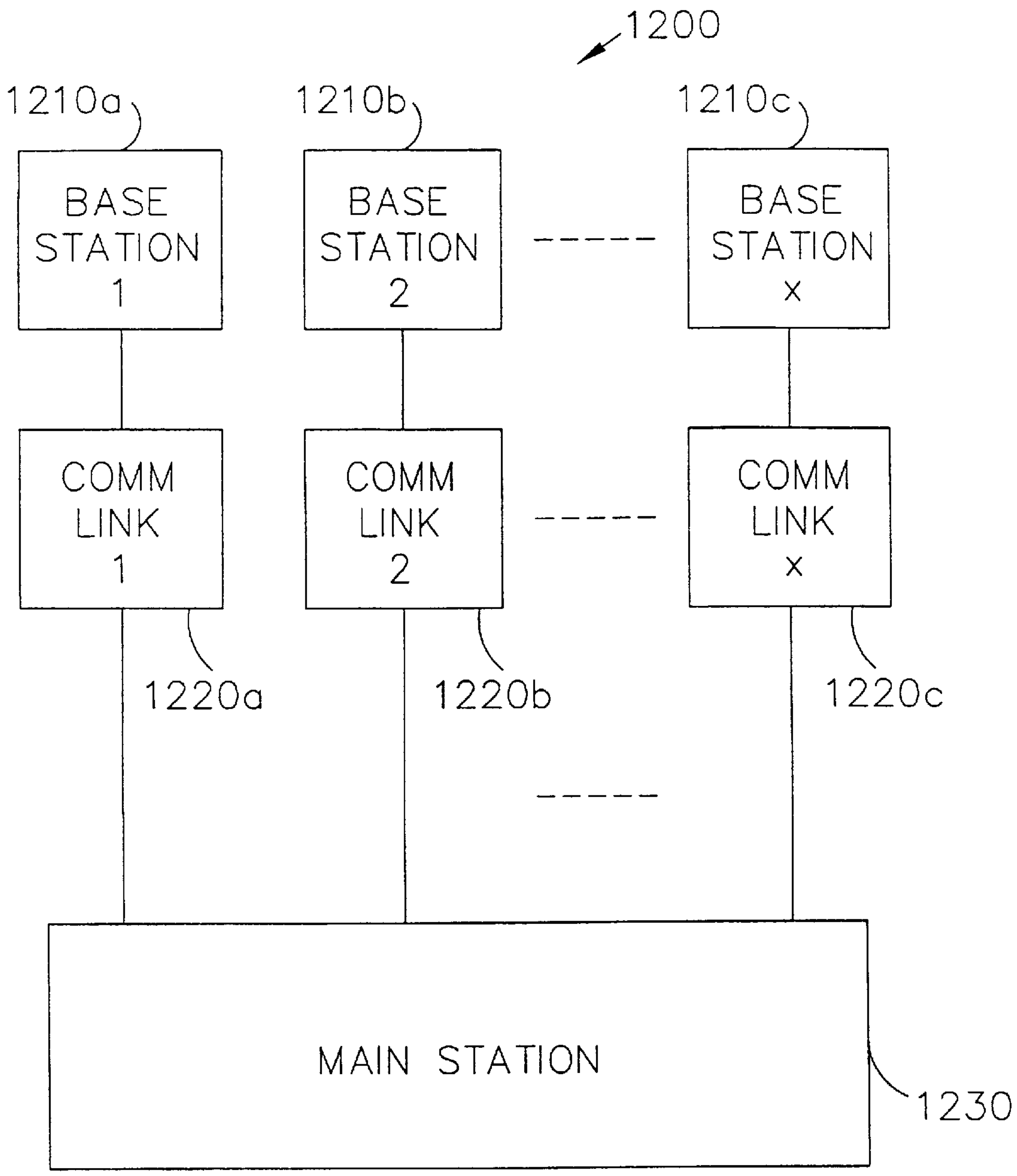
FIG. 12 shows a monitoring and control system, according to another embodiment of the invention, having a main station coupled through a plurality of communication links to a plurality of base stations.

FIG. 12 shows a monitoring and control system 1200, according to another embodiment of the invention, having a main station 1230 coupled through a plurality of communication links 1220*a–c* to a plurality of respective base stations 1210*a–c*.

Base stations 1210*a–c* can have a variety of configurations such as those shown in FIGS. 11A–B. Communication links 1220*a–c* allow respective base stations 1210*a–c* to pass monitoring data to main station 1230 and to receive control information from main station 1230. Processing of the monitoring data can either be performed at base stations 1210*a–c* or at main station 1230.

Figure 13:
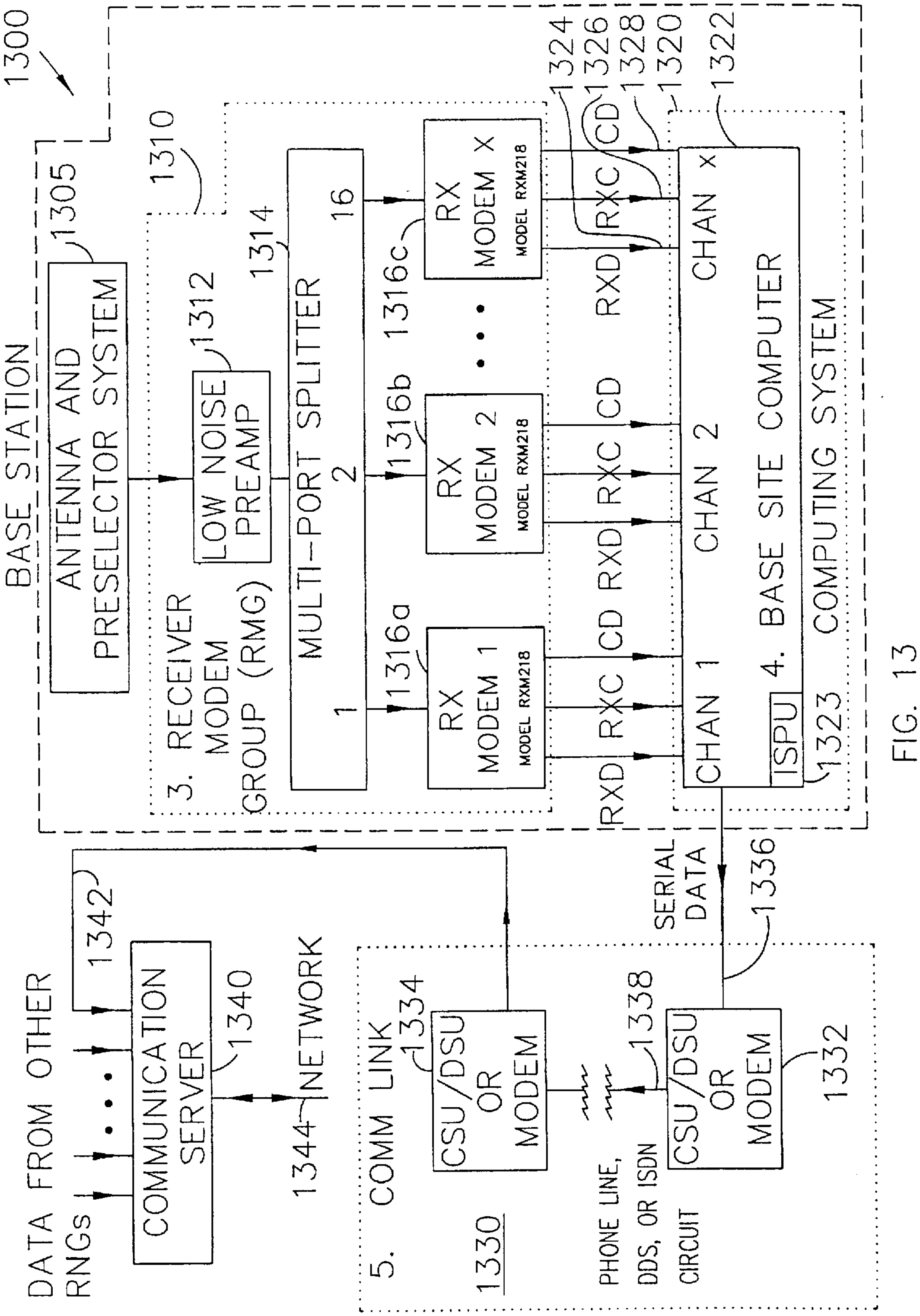
FIG. 13 shows a base station, according to another embodiment of the invention.

FIG. 13 shows a base station 1300 which is coupled to a communication server 1340 via a communication link 1330, according to another embodiment of the invention. Base station 1300 includes an antenna and preselector system 1305, a receiver modem group (RMG) 1310, and a computing system 1320.

Antenna and preselector system 1305 are similar to RX antenna system 1110 and receiving system front end 1120 which were previously discussed. Antenna and preselector system 1305 can include either one antenna or an array of antennas and preselection filtering as required by the application. Antenna and preselector system 1305 receives RF monitoring data and outputs preselected RF monitoring data.

Receiver modem group (RMG) 1310 includes a low noise pre-amp 1312, a multi-port splitter 1314, and several RX modems 1316*a–c*. Low noise pre-amp 1312 receives the preselected RF monitoring data from antenna and preselector system 1305 and outputs amplified RF monitoring data.

Multi-port splitter 1314 is coupled to low noise pre-amp 1312 for receiving the amplified RF monitoring data and outputting split RF monitoring data lines.

RX modems 1316*a–c* are coupled to multi-port splitter 1314 for receiving and demodulating one of the split RF monitoring data lines and outputting received data (RXD) 1324, received clock (RXC) 1326, and carrier detect (CD) 1328. These signals can use a standard interface such as RS-232 or RS-422 or can use a proprietary interface.

Computing system 1320 includes at least one base site computer 1322 for receiving RXD, RXC, and CD from RX modems 1316*a–c*, and outputting a serial data stream.

Computing system 1320 further includes an ID and status processing unit (ISPU) 1323 which processes ID and status data from the packets of monitoring data in RXD. ISPU 1323 can be implemented as software, hardware, or firmware. Using ISPU 1323, computing system 1320 can decode the packets of monitoring data in the demodulated signals, or can simply pass, without decoding, the packets of monitoring data on to another device in the serial data stream, or can both decode and pass the packets of monitoring data.

Communication link 1330 includes a first communication interface 1332, a second communication interface 1334, a first interface line 1336, a second interface line 1342, and a link 1338.

First communication interface 1332 receives the serial data stream from computing system 1320 of base station 1300 via first interface line 1336. First communication interface 1332 can be co-located with computing system 1320 or be remotely located. First communication interface 1332 can be implemented in a variety of ways using, for example, a CSU, DSU, or modem.

Second communication interface 1334 is coupled to first communication interface 1332 via link 1338. Link 1338 can be implemented using a standard phone line, DDS line, ISDN line, T1, fiber optic line, or RF link. Second communication interface 1334 can be implemented similarly to first communication interface 1332 using, for example, a CSU, DSU, or modem.

Communication link 1330 outputs communicated serial data from second communication interface 1334 via second communication line 1342.

Communication server 1340 is coupled to communication link 1330 for receiving communicated serial data via second communication line 1342. Communication server 1340 receives several lines of communicated serial data from several computing systems 1320 and multiplexes them to output multiplexed serial data on to a data network. The data network can be a public or private data network such as an internet or intranet.

FIGS. 14A–E show methods for implementation of logic for lamp monitoring and control system 600, according to a further embodiment of the invention.

Figure 14A:
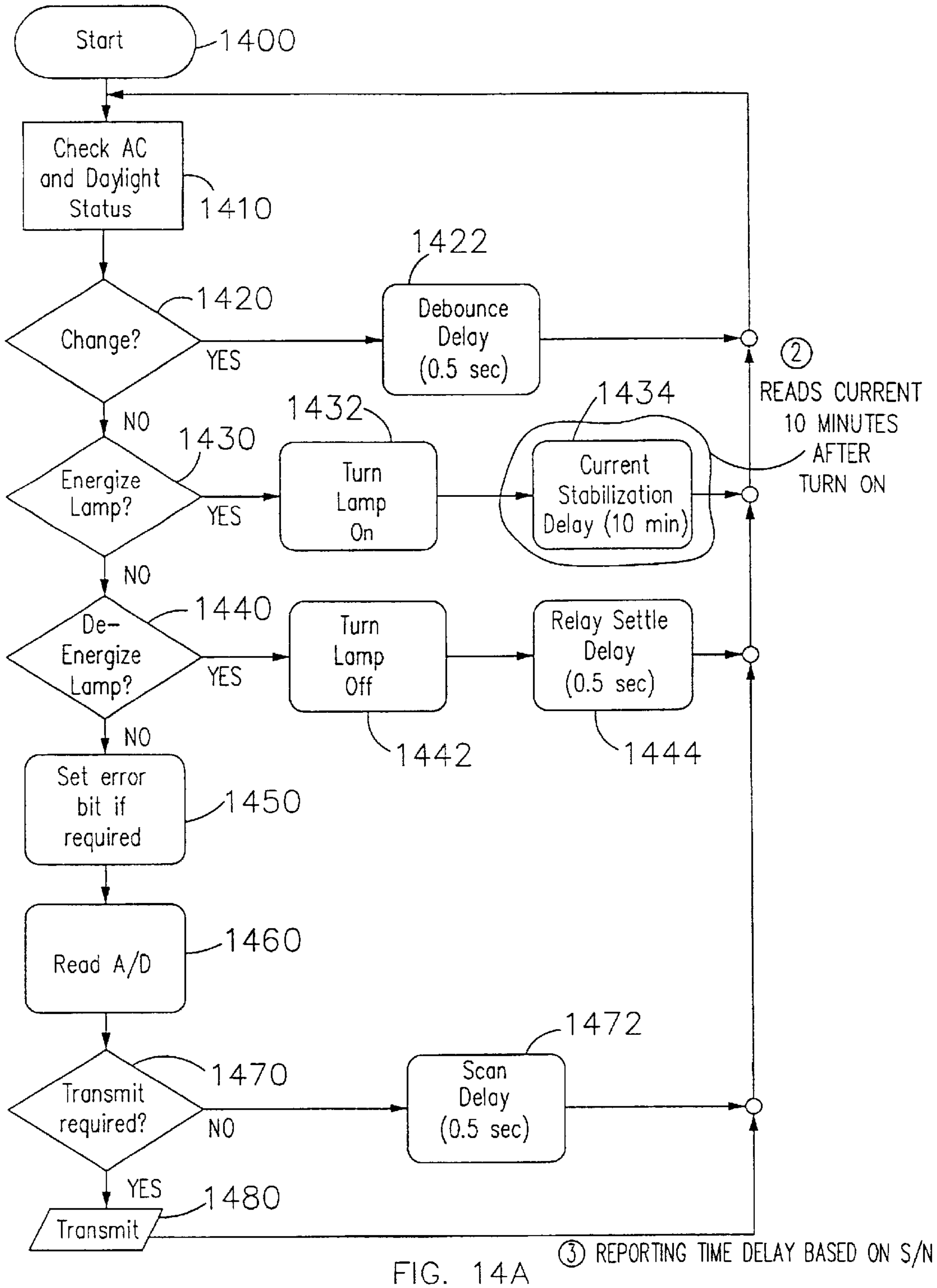
FIGS. 14A–E show a method for one implementation of logic for a monitoring and control system, according to another embodiment of the invention.

FIG. 14A shows one method for energizing and de-energizing a street lamp and transmitting associated monitoring data. The method of FIG. 14A shows a single transmission for each control event. The method begins with a start block 1400 and proceeds to step 1410 which involves checking AC and Daylight Status. The Check AC and Daylight Status step 1410 is used to check for conditions where the AC power and/or the Daylight Status have changed. If a change does occur, the method proceeds to step 1420 which is a decision block based on the change.

If a change occurred, step 1420 proceeds to a Debounce Delay step 1422 which involves inserting a Debounce Delay. For example, the Debounce Delay may be 0.5 seconds. After Debounce Delay step 1422, the method leads back to Check AC and Daylight Status step 1410.

If no change occurred, step 1420 proceeds to step 1430 which is a decision block to determine whether the lamp should be energized. If the lamp should be energized, then the method proceeds to step 1432 which turns the lamp on. After step 1432 when the lamp is turned on, the method proceeds to step 1434 which involves Current Stabilization Delay to allow the current in the street lamp to stabilize. The amount of delay for current stabilization depends upon the type of lamp used. However, for a typical vapor lamp a ten minute stabilization delay is appropriate. After step 1434, the method leads back to step 1410 which checks AC and Daylight Status.

Returning to step 1430, if the lamp is not to be energized, then the method proceeds to step 1440 which is a decision block to check to deenergize the lamp. If the lamp is to be deenergized, the method proceeds to step 1442 which involves turning the Lamp Off. After the lamp is turned off, the method proceeds to step 1444 in which the relay is allowed a Settle Delay time. The Settle Delay time is dependent upon the particular relay used and may be, for example, set to 0.5 seconds. After step 1444, the method returns to step 1410 to check the AC and Daylight Status.

Returning to step 1440, if the lamp is not to be deenergized, the method proceeds to step 1450 in which an error bit is set, if required. The method then proceeds to step 1460 in which an A/D is read.

The method then proceeds from step 1460 to step 1470 which checks to see if a transmit is required. If no transmit is required, the method proceeds to step 1472 in which a Scan Delay is executed. The Scan Delay depends upon the circuitry used and, for example, may be 0.5 seconds. After step 1472, the method returns to step 1410 which checks AC and Daylight Status.

Returning to step 1470, if a transmit is required, then the method proceeds to step 1480 which performs a transmit operation. After the transmit operation of step 1480 is completed, the method then returns to step 1410 which checks AC and Daylight Status.

Figure 14B:
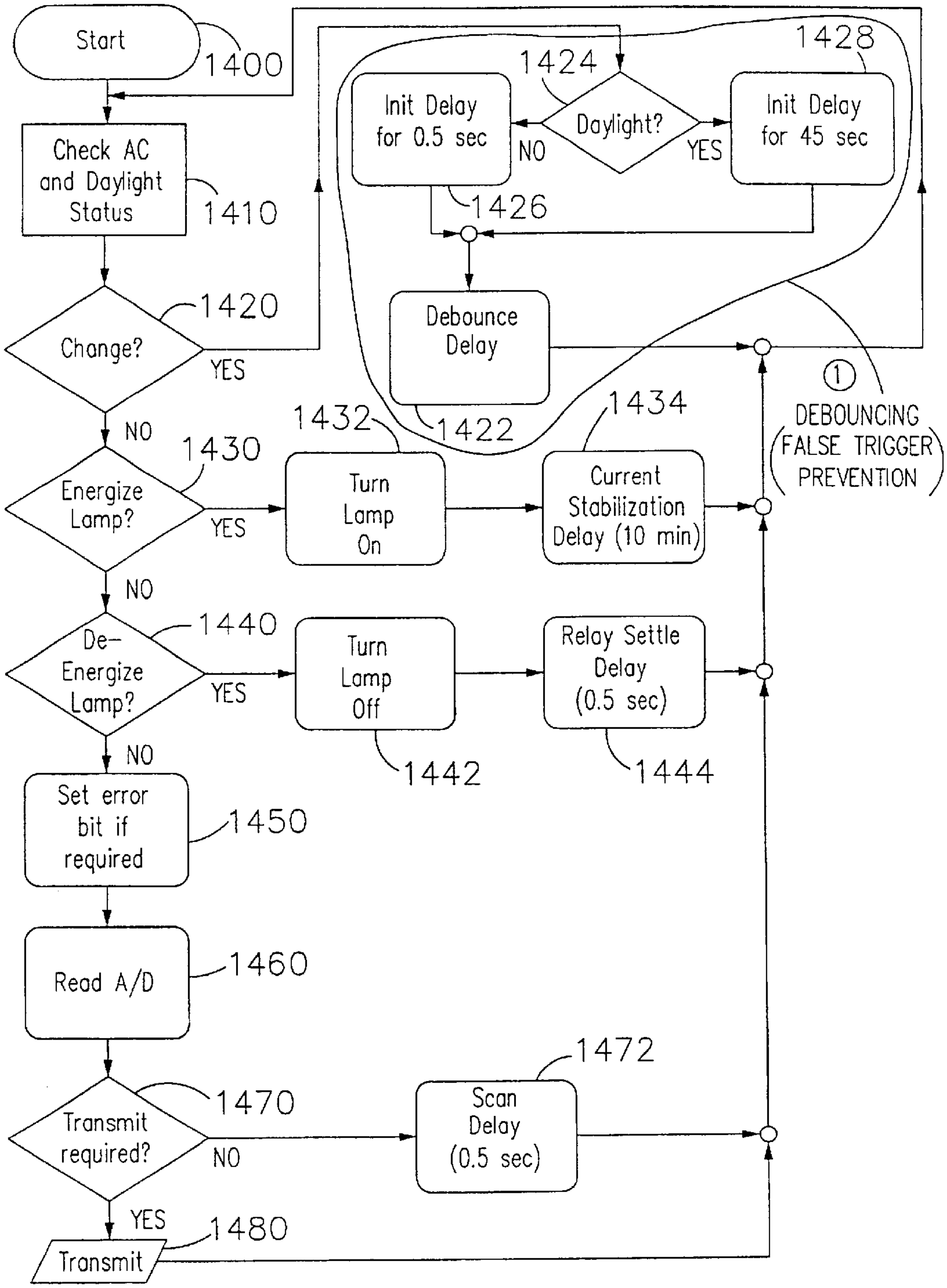

FIG. 14B is analogous to FIG. 14A with one modification. This modification occurs after step 1420. If a change has occurred, rather than simply executing step 1422, the Debounce Delay, the method performs a further step 1424 which involves checking whether daylight has occurred. If daylight has not occurred, then the method proceeds to step 1426 which executes an Initial Delay. This initial delay may be, for example, 0.5 seconds. After step 1426, the method proceeds to step 1422 and follows the same method as shown in FIG. 14A.

Returning to step 1424 which involves checking whether daylight has occurred, if daylight has occurred, the method proceeds to step 1428 which executes an Initial Delay. The Initial Delay associated with step 1428 should be a significantly larger value than the Initial Delay associated with step 1426. For example, an Initial Delay of 45 seconds may be used. The Initial Delay of step 1428 is used to prevent a false triggering which deenergizes the lamp. In actual practice, this extended delay can become very important because if the lamp is inadvertently deenergized too soon, it requires a substantial amount of time to reenergize the lamp (for example, ten minutes). After step 1428, the method proceeds to step 1422 which executes a Debounce Delay and then returns to step 1410 as shown in FIGS. 14A and 14B.

Figure 14C:
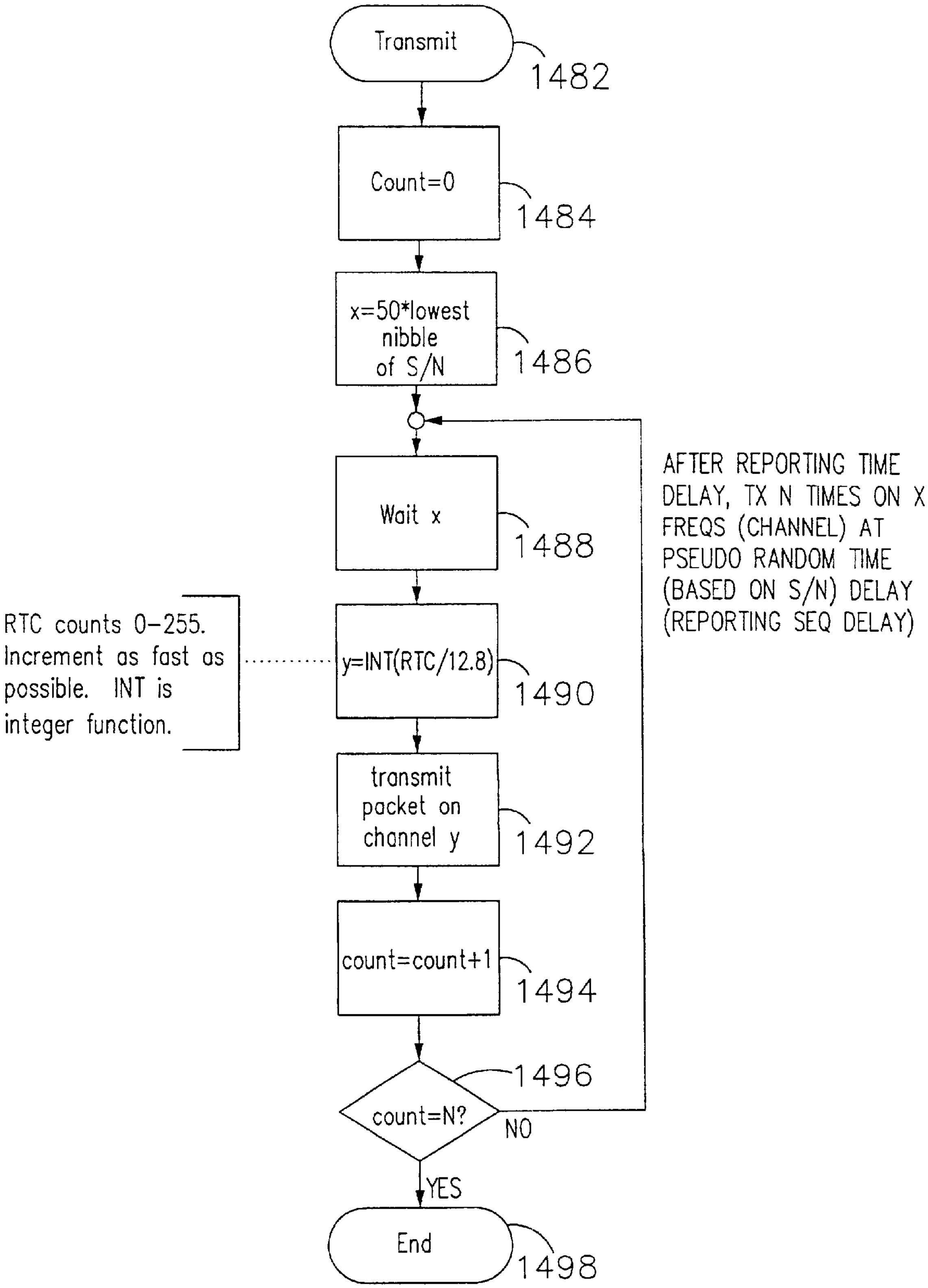

FIG. 14C shows a method for transmitting monitoring data multiple times in monitoring and control unit 510, according to a further embodiment of the invention. This method is particularly important in applications in which monitoring and control unit 510 does not have a RX unit 540 for receiving acknowledgments of transmissions.

The method begins with a transmit start block 1482 and proceeds to step 1484 which involves initializing a count value, i.e. setting the count value to zero. The method proceeds from step 1484 to step 1486 which involves setting a variable x to a value associated with a serial number of monitoring and control unit 510. For example, variable x may be set to 50 times the lowest nibble of the serial number.

The method proceeds from step 1486 to step 1488 which involves waiting a reporting start time delay associated with the value x. The reporting start time is the amount of delay time before the first transmission. For example, this delay time may be set to x seconds where x is an integer between 1 and 32,000 or more. This example range for x is particularly useful in the street lamp application since it distributes the packet reporting start times over more than eight hours, approximately the time from sunset to sunrise.

The method proceeds from step 1488 to step 1490 in which a variable y representing a channel number is set. For example, y may be set to the integer value of RTC/12.8, where RTC represents a real time clock counting from 0–255 as fast as possible. The RTC may be included in processing and sensing unit 520.

The method proceeds from step 1490 to step 1492 in which a packet is transmitted on channel y. Step 1492 proceeds to step 1494 in which the count value is incremented. Step 1494 proceeds to step 1496 which is a decision block to determine if the count value equals an upper limit N.

If the count is not equal to N, the method returns from step 1496 to step 1488 and waits another delay time associated with variable x. This delay time is the reporting delta time since it represents the time difference between two consecutive reporting events.

If the count is equal to N, the method proceeds from step 1496 to step 1498 which is an end block. The value for N must be determined based on the specific application. Increasing the value of N decreases the probability of a unsuccessful transmission since the same data is being sent multiple times and the probability of all of the packets being lost decreases as N increases. However, increasing the value of N increases the amount of traffic which may become an issue in a monitoring and control system with a plurality of monitoring and control units.

Figure 14D:
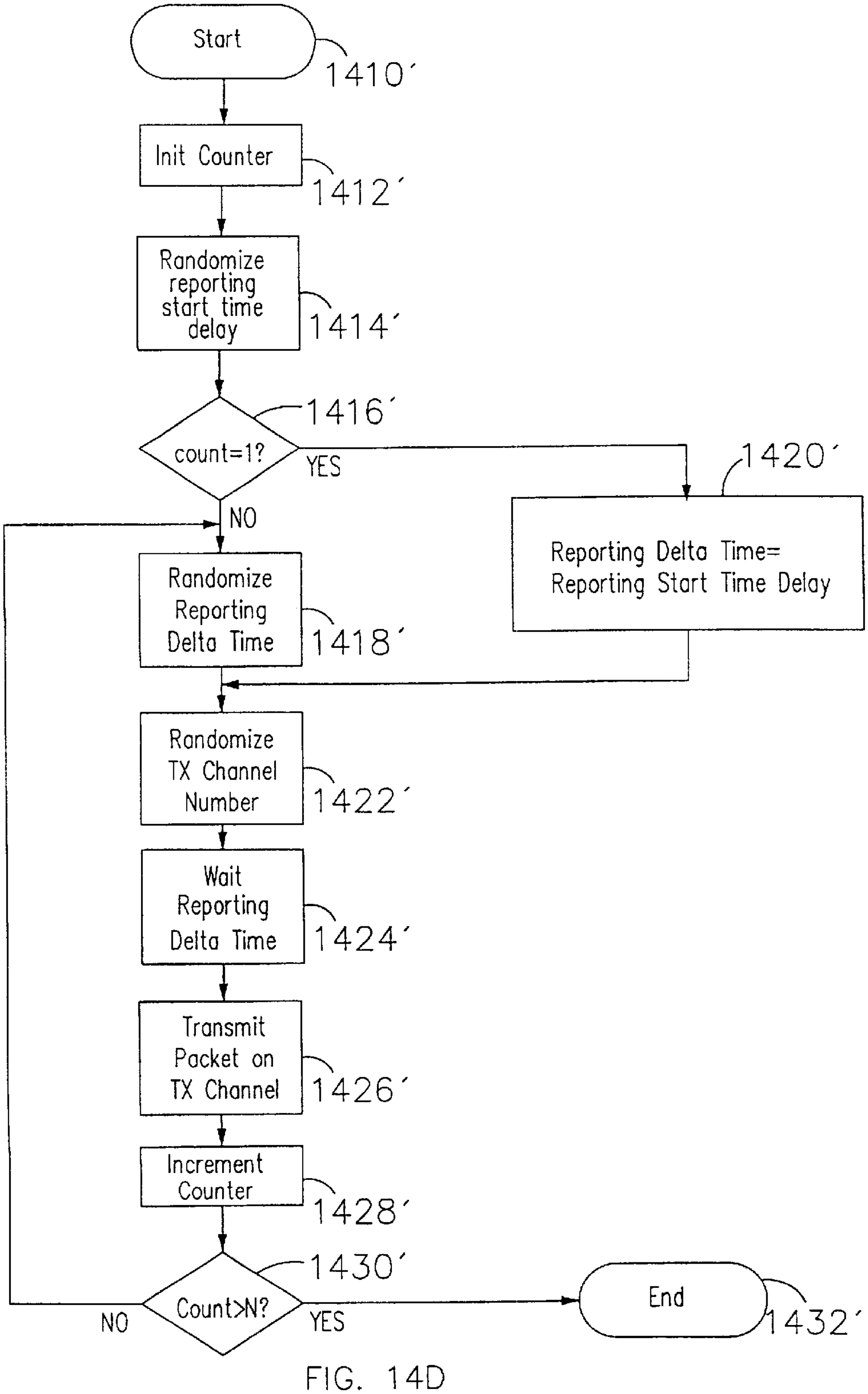

FIG. 14D shows a method for transmitting monitoring data multiple times in a monitoring and control system according to a another embodiment of the invention.

The method begins with a transmit start block 1410' and proceeds to step 1412' which involves initializing a count value, i.e., setting the count value to 1. The method proceeds from step 1412' to step 1414' which involves randomizing the reporting start time delay. The reporting start time delay is the amount of time delay required before the transmission of the first data packet. A variety of methods can be used for this randomization process such as selecting a pseudo-random value or basing the randomization on the serial number of monitoring and control unit 510.

The method proceeds from step 1414' to step 1416' which involves checking to see if the count equals 1. If the count is equal to 1, then the method proceeds to step 1420' which involves setting a reporting delta time equal to the reporting start time delay. If the count is not equal to 1, the method proceeds to step 1418' which involves randomizing the reporting delta time. The reporting delta time is the difference in time between each reporting event. A variety of methods can be used for randomizing the reporting delta time including selecting a pseudo-random value or selecting a random number based upon the serial number of the monitoring and control unit 510.

After either step 1418' or step 1420', the method proceeds to step 1422' which involves randomizing a transmit channel number. The transmit channel number is a number indicative of the frequency used for transmitting the monitoring data. There are a variety of methods for randomizing the transmit channel number such as selecting a pseudo-random number or selecting a random number based upon the serial number of the monitoring and control unit 510.

The method proceeds from step 1422' to step 1424' which involves waiting the reporting delta time. It is important to note that the reporting delta time is the time which was selected during the randomization process of step 1418' or the reporting start time delay selected in step 1414', if the count equals 1. The use of separate randomization steps 1414' and 1418' is important because it allows the use of different randomization functions for the reporting start time delay and the reporting delta time, respectively.

After step 1424' the method proceeds to step 1426' which involves transmitting a packet on the transmit channel selected in step 1422'.

The method proceeds from step 1426' to step 1428' which involves incrementing the counter for the number of packet transmissions.

The method proceeds from step 1428' to step 1430' in which the count is compared with a value N which represents the maximum number of transmissions for each packet. If the count is less than or equal to N, then the method proceeds from step 1430' back to step 1418' which involves randomizing the reporting delta time for the next transmission. If the count is greater than N, then the method proceeds from step 1430' to the end block 1432' for the transmission method.

In other words, the method will continue transmission of the same packet of data N times, with randomization of the reporting start time delay, randomization of the reporting delta times between each reporting event, and randomization of the transmit channel number for each packet. These multiple randomizations help stagger the packets in the frequency and time domain to reduce the probability of collisions of packets from different monitoring and control units.

Figure 14E:
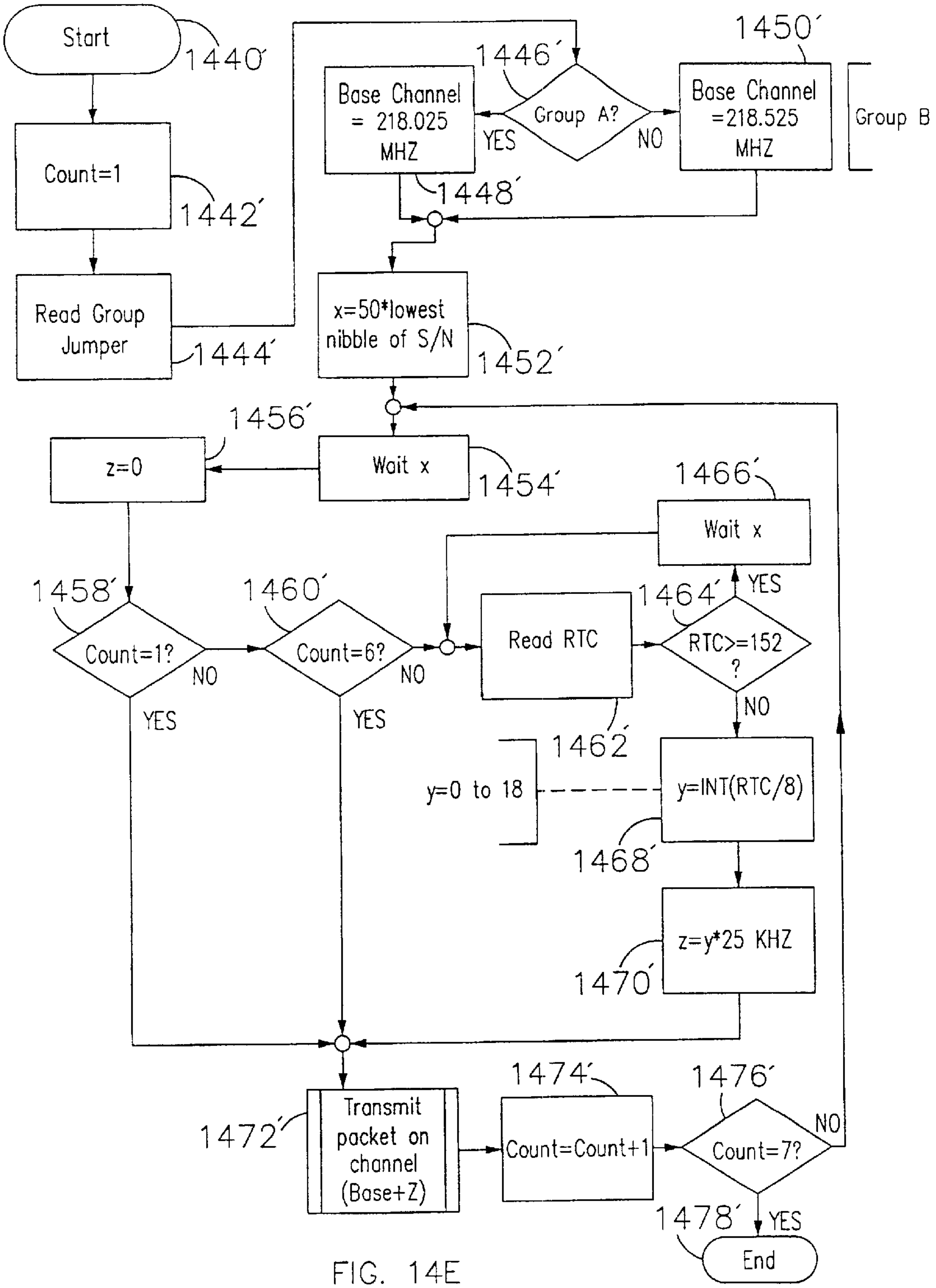

FIG. 14E shows a further method for transmitting monitoring data multiple times from a monitoring and control unit 510, according to another embodiment of the invention.

The method begins with a transmit start block 1440' and proceeds to step 1442' which involves initializing a count value, i.e., setting the count value to 1. The method proceeds from step 1442' to step 1444' which involves reading an indicator, such as a group jumper, to determine which group of frequencies to use, Group A or B. Examples of Group A and Group B channel numbers and frequencies can be found in FIG. 8.

Step 1444' proceeds to step 1446' which makes a decision based upon whether Group A or B is being used. If Group A is being used, step 1446' proceeds to step 1448' which involves setting a base channel to the appropriate frequency for Group A. If Group B is to be used, step 1446' proceeds to step 1450' which involves setting the base channel frequency to a frequency for Group B.

After either Step 1448' or step 1450', the method proceeds to step 1452' which involves randomizing a reporting start time delay. For example, the randomization can be achieved by multiplying the lowest nibble of the serial number of monitoring and control unit 510 by 50 and using the resulting value, x, as the number of milliseconds for the reporting start time delay.

The method proceeds from step 1452' to step 1454' which involves waiting x number of seconds as determined in step 1452'.

The method proceeds from step 1454' to step 1456' which involves setting a value z=0, where the value z represents an offset from the base channel number set in step 1448' or 1450'. Step 1456' proceeds to step 1458' which determines whether the count equals 1. If the count equals 1, the method proceeds from step 1458' to step 1472' which involves transmitting the packet on a channel determined from the base channel frequency selected in either step 1448' or step 1450' plus the channel frequency offset selected in step 1456'.

If the count is not equal to 1, then the method proceeds from step 1458' to step 1460' which involves determining whether the count is equal to N, where N represents the maximum number of packet transmissions. If the count is equal to N, then the method proceeds from step 1460' to step 1472' which involves transmitting the packet on a channel determined from the base channel frequency selected in either step 1448' or step 1450' plus the channel number offset selected in step 1456'.

If the count is not equal to N, indicating that the count is a value between 1 and N, then the method proceeds from step 1460' to step 1462' which involves reading a real time counter (RTC) which may be located in processing and sensing unit 412.

The method proceeds from step 1462' to step 1464' which involves comparing the RTC value against a maximum value, for example, a maximum value of 152. If the RTC value is greater than or equal to the maximum value, then the method proceeds from step 1464' to step 1466' which involves waiting x seconds and returning to step 1462'.

If the value of the RTC is less than the maximum value, then the method proceeds from step 1464' to step 1468' which involves setting a value y equal to a value indicative of the channel number offset. For example, y can be set to an integer of the real time counter value divided by 8, so that Y value would range from 0 to 18.

The method proceeds from step 1468' to step 1470' which involves computing a frequency offset value z from the channel number offset value y. For example, if a 25 KHz channel is being used, then z is equal to y times 25 KHz.

The method then proceeds from step 1470' to step 1472' which involves transmitting the packet on a channel determined from the base channel frequency selected in either step 1448' or step 1450' plus the channel frequency offset computed in step 1470'.

The method proceeds from step 1472' to step 1474' which involves incrementing the count value. The method proceeds from step 1474' to step 1476' which involves comparing the count value to a value N+1 which is related to the maximum number of transmissions for each packet. If the count is not equal to N+1, the method proceeds from step 1476' back to step 1454' which involves waiting x number of milliseconds. If the count is equal to N+1, the method proceeds from step 1476' to the end block 1478'.

The method shown in FIG. 14E is similar to that shown in FIG. 14D, but differs in that it requires the first and the Nth transmission to occur at the base frequency rather than a randomly selected frequency.

The foregoing embodiments are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A base station for monitoring a plurality of lamps by receiving RF monitoring data having an ID field and a status field, comprising:

an RX antenna system for receiving the RF monitoring data;

a receiving system front end, coupled to said RX antenna system, for receiving the RF monitoring data and outputting received RF monitoring data;

a multi-port splitter, coupled to said receiving system front end, for receiving the received RF monitoring data and outputting split RF monitoring data;

a plurality of RX modems, coupled to said multi-port splitter, each for receiving and demodulating the split RF monitoring data and outputting a received data signal;

a computing system, coupled to said plurality of RX modems, for receiving the received data signal from each of said plurality of RX modems; and an ID and status processing unit, within said computing system, for processing the ID field of the received data signal.

2. The base station of claim 1, wherein the ID and status processing unit is software.

3. The base station of claim 1, wherein the ID and status processing unit is coupled to a database for storing the ID field and the status field.

4. The base station of claim 1, wherein the ID and status processing unit decodes the ID field and the status field of the received data.

5. The base station of claim 1, wherein the ID and status processing unit passes the received data to a main station.

6. The base station of claim 1, wherein the ID and status processing unit passes the received data to a further base station.

7. The base station of claim 1, wherein the received data is RS-232 data.

8. The base station of claim 1, wherein said computing system outputs control information to the plurality of lamps.

9. A method of making a base station for monitoring a plurality of lamps by receiving RF monitoring data having an ID field and a status field, comprising the steps of:

providing an RX antenna system for receiving the RF monitoring data and outputting a received RF monitoring data;

coupling a multi-port splitter to said receiving system front end, for receiving the received RF monitoring data and outputting split RF monitoring data;

further coupling a plurality of RX modems to said multi-port splitter, each for receiving and demodulating the split RF monitoring data and outputting a received data signal;

further providing a computing system, coupled to said plurality of RX modems, for receiving the received data signal from each of said plurality of RX modems; and arranging an ID and status processing unit, within said computing system, for processing the ID field of the received data signal.

10. A base station for receiving monitoring data from a plurality of lamps monitored and controlled by a lamp monitoring and control system, the monitoring data having an ID field and a status field, the base station comprising:

a signal receiver, to receive monitoring data;

a multi-port splitter, to split the received monitoring data; and a processing unit, to process the received monitoring data, wherein the ID field indicates a particular lamp of the plurality of lamps to which the monitoring data corresponds.

11. The base station of claim 10, wherein the processing unit is for processing spontaneously transmitted monitoring data.

12. The base station of claim 11, wherein the spontaneously transmitted monitoring data is transmitted by a transmitter connected to the particular lamp.

13. The base station of claim 10, wherein the signal receiver is an antenna and the monitoring data is RF monitoring data.

14. The base station of claim 1, wherein the base station is adapted to receive the monitoring data as a remotely generated spontaneous transmissions.

15. The base station of claim 9, wherein the base station is adapted to receive the monitoring data as a remotely generated spontaneous transmission.

16. The base station of claim 10, further comprising a plurality of modems coupled to the multi-port splitter to receive and demodulate a corresponding split RF signal.

17. The base station of claim 16, wherein each of the plurality of modems is configured to operate at a prescribed frequency different from the other modems, and wherein each frequency corresponds to a frequency of each of a plurality of corresponding transmitters.

18. The base station of claim 17, wherein each one of the plurality of transmitters is coupled to a lamp monitoring and control unit that is configured to monitor a status of a lamp and transmit the status to the base station.

19. The base station of claim 18, wherein the status is transmitted wirelessly to the base station.

20. The base station of claim 19, wherein each transmitter transmits at a frequency different from the frequencies used by the other transmitters in communication with the base station.

* * * * *